(12) United States Patent
Zhu

(10) Patent No.: US 11,678,078 B2
(45) Date of Patent: Jun. 13, 2023

(54) SOLID-STATE IMAGING DEVICE, IMAGING APPARATUS, AND METHOD FOR CONTROLLING SOLID-STATE IMAGING DEVICE FOR DETECTING OCCURRENCE OF AN ADDRESS EVENT OF PIXELS

(71) Applicant: SONY SEMICONDUCTOR SOLUTIONS CORPORATION, Kanagawa (JP)

(72) Inventor: Hongbo Zhu, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 17/295,499

(22) PCT Filed: Oct. 15, 2019

(86) PCT No.: PCT/JP2019/040375
§ 371 (c)(1),
(2) Date: May 20, 2021

(87) PCT Pub. No.: WO2020/110484
PCT Pub. Date: Jun. 4, 2020

(65) Prior Publication Data
US 2022/0006965 A1   Jan. 6, 2022

(30) Foreign Application Priority Data
Nov. 29, 2018   (JP) .............................. JP2018-223477

(51) Int. Cl.
*H04N 25/53*   (2023.01)
*H04N 25/75*   (2023.01)
*H04N 25/772*   (2023.01)

(52) U.S. Cl.
CPC ............. *H04N 25/53* (2023.01); *H04N 25/75* (2023.01); *H04N 25/772* (2023.01)

(58) Field of Classification Search
CPC ..... H04N 5/353; H04N 5/37455; H04N 5/378
See application file for complete search history.

(56) References Cited

U.S. PATENT DOCUMENTS

| 2018/0167575 A1* | 6/2018 | Watanabe ............ H04N 5/3745 |
| 2018/0270405 A1 | 9/2018 | Ota |

(Continued)

FOREIGN PATENT DOCUMENTS

| CN | 108293099 A | 7/2018 |
| EP | 3389259 A1 | 10/2018 |

(Continued)

OTHER PUBLICATIONS

International Search Report and Written Opinion of PCT Application No. PCT/JP2019/040375, dated Dec. 3, 2019, 11 pages of ISRWO.

(Continued)

*Primary Examiner* — Nicholas G Giles
(74) *Attorney, Agent, or Firm* — Chip Law Group

(57) ABSTRACT

A solid-state imaging device that detects the presence or absence of an address event further captures an image. The solid-state imaging device includes a detection pixel and a counting pixel. In the solid-state imaging device, the detection pixel detects whether or not a predetermined address event has occurred, depending on whether or not the amount of change in the amount of incident light exceeds a predetermined threshold. Further, in the solid-state imaging device, in a case where an address event has occurred, the counting pixel counts the number of photons entering during a predetermined exposure period and outputs a pixel signal indicating the count value.

13 Claims, 23 Drawing Sheets

(56) References Cited

U.S. PATENT DOCUMENTS

2018/0278877 A1 9/2018 Yamahira
2021/0126025 A1* 4/2021 Kennedy ............. H01L 27/1461

FOREIGN PATENT DOCUMENTS

| JP | 2018-148362 A | 9/2018 |
| JP | 2018-157387 A | 10/2018 |
| WO | 2017/013806 A1 | 1/2017 |
| WO | 2017/098710 A1 | 6/2017 |

OTHER PUBLICATIONS

Lichtsteiner, et al., "A 128 128 120 dB 15 µs Latency Asynchronous Temporal Contrast Vision Sensor", IEEE Journal of Solid-State Circuits, vol. 43, No. 2, Feb. 2008, 11 pages.

* cited by examiner

SOLID-STATE IMAGING DEVICE, IMAGING APPARATUS, AND METHOD FOR CONTROLLING SOLID-STATE IMAGING DEVICE FOR DETECTING OCCURRENCE OF AN ADDRESS EVENT OF PIXELS

CROSS REFERENCE TO RELATED APPLICATIONS

This application is a U.S. National Phase of International Patent Application No. PCT/JP2019/040375 filed on Oct. 15, 2019, which claims priority benefit of Japanese Patent Application No. JP 2018-223477 filed in the Japan Patent Office on Nov. 29, 2018. Each of the above-referenced applications is hereby incorporated herein by reference in its entirety.

TECHNICAL FIELD

The present technology relates to a solid-state imaging device, an imaging apparatus, and a method for controlling a solid-state imaging device. More particularly, the present technology relates to a solid-state imaging device that compares the amount of change in the amount of incident light with a threshold, an imaging apparatus, and a method for controlling a solid-state imaging device.

BACKGROUND ART

Conventionally, a synchronous solid-state imaging device that captures an image from image data (frames) in synchronization with a synchronization signal such as a vertical synchronization signal has been used in an imaging apparatus or the like. In such a conventional synchronous solid-state imaging device, image data can be acquired only in every synchronization signal cycle (1/60 second, for example). Therefore, it is difficult to cope with a case where faster processing is required in the fields related to transportation and robots. In view of this, an asynchronous solid-state imaging device that includes a circuit for detecting an address event has been suggested (see Non-Patent Document 1, for example). Here, an address event means that, at a certain pixel address, the amount of pixel light changes, and the amount of change exceeds a threshold. This address event includes an on-event indicating that the amount of pixel light fluctuates, and the amount of change exceeds a predetermined upper limit, and an off-event indicating that the amount of change has fallen below a predetermined lower limit. In the asynchronous solid-state imaging device, 2-bit data formed with a 1-bit on-event detection result and a 1-bit off-event detection result is generated for each pixel. A solid-state imaging device that detects the presence or absence of an address event for each pixel in this manner is called a dynamic vision sensor (DVS).

CITATION LIST

Non-Patent Document

Non-Patent Document 1: Patrick Lichtsteiner, et al., A 128 128 120 dB 15 µs Latency Asynchronous Temporal Contrast Vision Sensor, IEEE JOURNAL OF SOLID-STATE CIRCUITS, VOL. 43, NO. 2, FEBRUARY 2008.

SUMMARY OF THE INVENTION

Problems to be Solved by the Invention

The asynchronous solid-state imaging device (DVS) described above generates data much faster than a synchronous solid-state imaging device. In image recognition and the like, however, high-quality image data of three or more bits, as well as the detection of the presence or absence of an address event, is required for each pixel, and the above DVS that generates 2-bit data for each pixel cannot satisfy the requirement. To capture an image from higher-quality image data, both a DVS and a synchronous solid-state imaging device may be provided, but this is not desirable because the size, the number of components, and the cost will increase. As described above, it is difficult to further capture a high-quality image in a solid-state imaging device (DVS) that detects the presence or absence of an address event.

The present technology has been developed in view of such circumstances, and aims to further capture an image in a solid-state imaging device that detects the presence or absence of an address event.

Solutions to Problems

The present technology has been developed to solve the above problem, and a first aspect thereof is a solid-state imaging device, and a method for controlling the solid-state imaging device. The solid-state imaging device includes: a detection pixel that detects whether or not a predetermined address event has occurred, depending on whether or not the amount of change in the amount of incident light exceeds a predetermined threshold; and a counting pixel that counts the number of photons entering during a predetermined exposure period and outputs a pixel signal indicating the count value, in a case where the address event has occurred. With this arrangement, an image can be captured during detection of the presence or absence of an address event.

Also, in the first aspect, the detection pixel may include: an address event detection circuit that detects whether or not the address event has occurred; and an exposure control circuit that outputs a control signal indicating the exposure period to the counting pixel, in a case where the address event has occurred. With this arrangement, the exposure time can be controlled by the detection pixel.

Also, in the first aspect, the exposure control circuit may include: a control signal output unit that starts outputting the control signal, in a case where the address event has occurred; a timer unit that measures the time elapsed since the start of the outputting of the control signal, and outputs a timer value indicating the measured time; and an exposure end timing control unit that stops the outputting of the control signal, in a case where the timer value matches the length of the exposure period. With this arrangement, the exposure period can be controlled in accordance with the timer value.

Also, in the first aspect, the solid-state imaging device may further include a drive circuit that causes the pixel signal to be output over a predetermined reading period, in a case where the exposure period has elapsed. The exposure control circuit may stop the outputting of the control signal during the reading period. With this arrangement, exposure is effectively stopped during the reading period.

Also, in the first aspect, in a case where the address event has occurred, the exposure control circuit may start outputting the control signal in synchronization with one of two periodic signals having different phases, and stop outputting the control signal in synchronization with the other one of the two periodic signals. With this arrangement, the exposure period can be controlled in accordance with the two periodic signals.

Also, in the first aspect, the counting pixel may include: an avalanche photodiode; a pulse conversion unit that generates a pulse signal every time a photocurrent flows into the avalanche photodiode; and a photon counter that measures the count value in synchronization with the pulse signal. With this arrangement, the number of incident photons can be counted.

Also, in the first aspect, the pulse conversion unit may include: a resistance element connected in series to the avalanche photodiode; and a switch that opens and closes a predetermined path in accordance with a predetermined control signal indicating the exposure period. With this arrangement, the number of photons entering over the exposure period can be counted.

Also, in the first aspect, the switch may open and close a path between the avalanche photodiode and the resistance element. With this arrangement, the number of photons entering over the exposure period can be counted.

Also, in the first aspect, the switch may open and close a path between the connection point between the avalanche photodiode and the resistance element, and the photon counter. With this arrangement, the number of photons entering over the exposure period can be counted.

Also, in the first aspect, the detection pixel may be disposed in each pixel block in a plurality of pixel blocks, a predetermined number of the counting pixels may be arrayed in each pixel block of the plurality of pixel blocks, and the counting pixel may count the number of photons in a pixel block in which the address event has occurred among the plurality of pixel blocks. With this arrangement, a pixel signal is effectively output only from a pixel block in which an address event has occurred.

Also, in the first aspect, the counting pixels may be arrayed in a two-dimensional lattice pattern, and the detection pixels may be aligned in a predetermined direction. With this arrangement, a pixel signal is effectively output from a row in which an address event has occurred.

Also, in the first aspect, the detection pixel may be larger in size than the counting pixel. With this arrangement, the circuits and elements can be efficiently arranged.

Further, a second aspect of the present technology is an imaging apparatus that includes: a detection pixel that detects whether or not a predetermined address event has occurred, depending on whether or not the amount of change in the amount of incident light exceeds a predetermined threshold; a counting pixel that counts the number of photons entering during a predetermined exposure period and outputs a pixel signal indicating the count value, in a case where the address event has occurred; and a signal processing unit that processes the pixel signal. With this arrangement, an image can be captured and processed during detection of the presence or absence of an address event.

MODES FOR CARRYING OUT THE INVENTION

The following is a description of modes for carrying out the present technology (the modes will be hereinafter referred to as embodiments). Explanation will be made in the following order.

1. First embodiment (an example in which address event detection pixels and SPAD pixels are arrayed)
2. Second embodiment (an example in which address event detection pixels and SPAD pixels are arrayed, and exposure is stopped during reading)
3. Third embodiment (an example in which address event detection pixels and SPAD pixels are arrayed, and exposure is controlled with two clock signals)
4. Fourth embodiment (a scan method)
5. Example applications to mobile structures 1. First Embodiment

[Example Configuration of an Imaging Apparatus]

Figure 1:
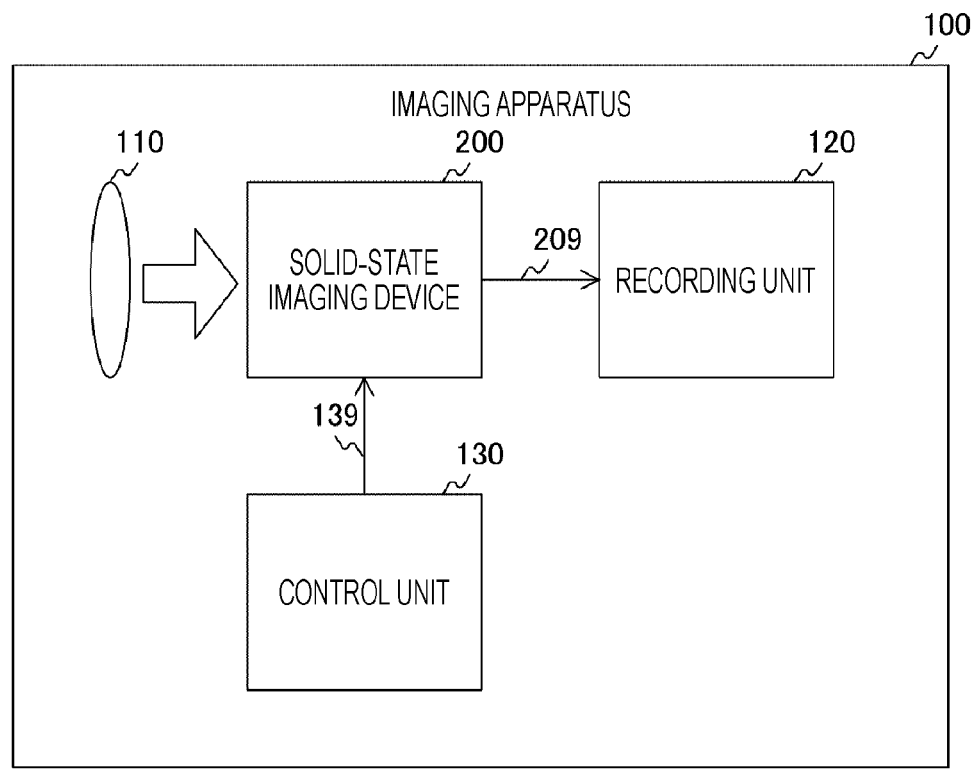
FIG. 1 is a block diagram showing an example configuration of an imaging apparatus according to a first embodiment of the present technology.

FIG. 1 is a block diagram showing an example configuration of an imaging apparatus 100 according to a first embodiment of the present technology. This imaging apparatus 100 includes an imaging lens 110, a solid-state imaging device 200, a recording unit 120, and a control unit 130. The imaging apparatus 100 may be a camera mounted on an industrial robot, an in-vehicle camera, or the like.

The imaging lens 110 gathers incident light and guides the incident light to the solid-state imaging device 200. The solid-state imaging device 200 captures an image from image data while detecting the presence or absence of an address event. Here, the address event includes an on-event and an off-event, and the detection result includes a 1-bit on-event detection result and a 1-bit off-event detection result. An on-event means that the amount of change in the amount of incident light has exceeded a predetermined upper threshold. On the other hand, an off-event means that the amount of change in the amount of light has fallen below a predetermined lower threshold. The solid-state imaging device 200 processes the address event detection result, and outputs data indicating the processing result to the recording unit 120 via a signal line 209. Note that the solid-state imaging device 200 may detect only on-events or only off-events.

The recording unit 120 records the data output from the solid-state imaging device 200. The control unit 130 controls the solid-state imaging device 200 to capture an image from image data while detecting the presence or absence of an address event.

[Example Configuration of a Solid-State Imaging Device]

Figure 2:
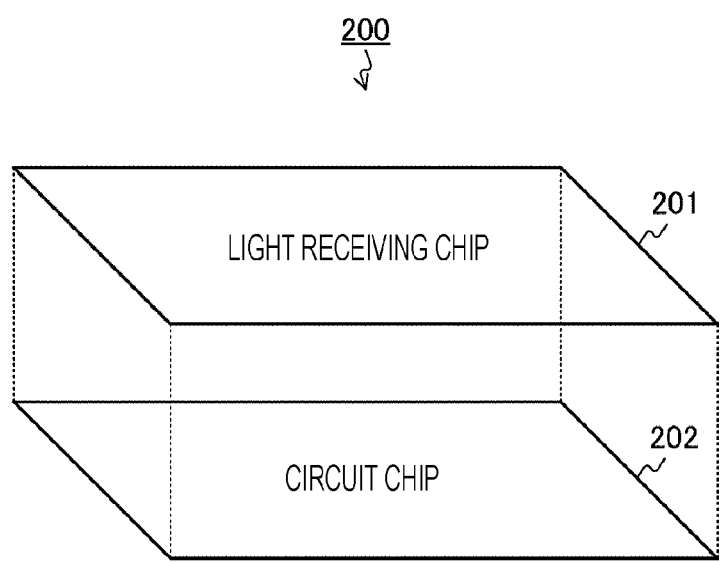
FIG. 2 is a diagram showing an example stack structure of a solid-state imaging device according to the first embodiment of the present technology.

FIG. 2 is a diagram showing an example stack structure of the solid-state imaging device 200 according to the first embodiment of the present technology. This solid-state imaging device 200 includes a circuit chip 202 and a light receiving chip 201 stacked on the circuit chip 202. These chips are electrically connected via a connecting portion such as a via. Note that these chips can be connected by Cu—Cu bonding or bumps, instead of a via.

Figure 3:
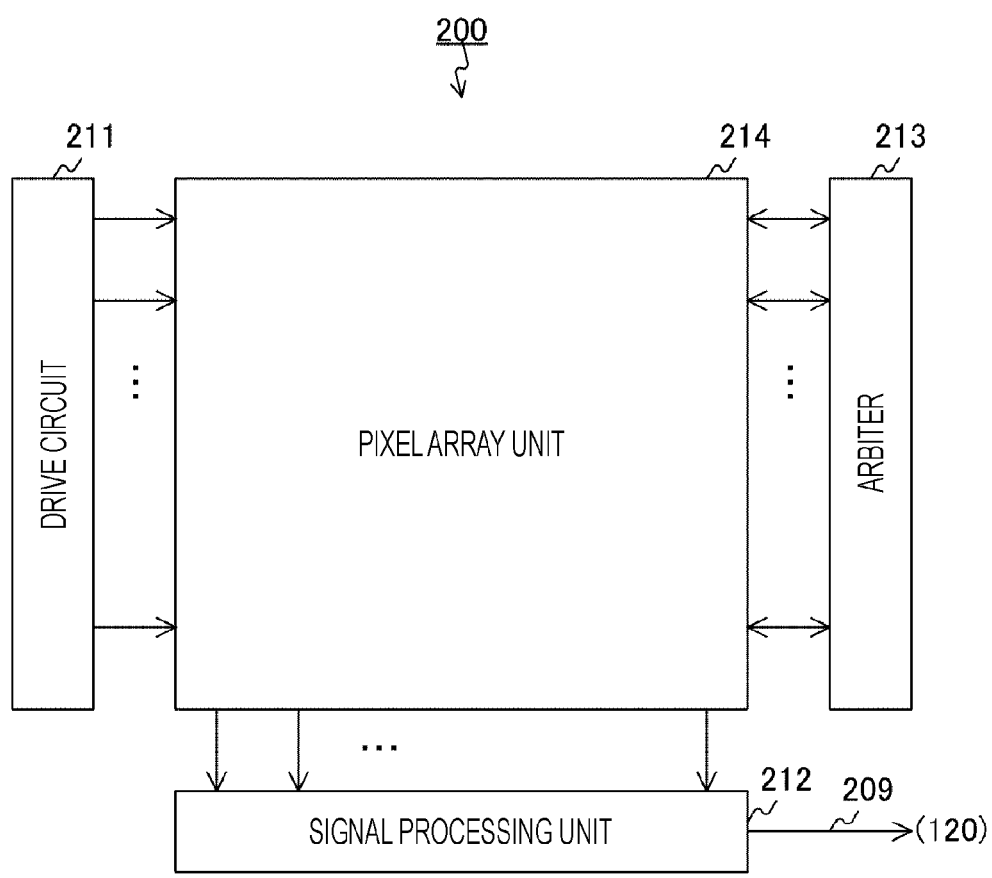
FIG. 3 is a block diagram showing an example configuration of a solid-state imaging device according to the first embodiment of the present technology.

FIG. 3 is a block diagram showing an example configuration of the solid-state imaging device 200 according to the first embodiment of the present technology. This solid-state imaging device 200 includes a drive circuit 211, a signal processing unit 212, an arbiter 213, and a pixel array unit 214.

In the pixel array unit 214, a plurality of pixels is arranged in a two-dimensional lattice pattern. Some of these pixels detect the presence or absence of an address event, and supply a detection signal indicating the detection result to the signal processing unit 212. On the other hand, the remaining pixels count the number of incident photons within the exposure period when an address event occurs, and output a pixel signal indicating the count value to the signal processing unit 212.

The drive circuit 211 drives the pixels in the pixel array unit 214 to output pixel signals when an address event occurs.

The signal processing unit 212 performs predetermined signal processing such as an image recognition process on the detection signals and the pixel signals from the pixel array unit 214. The signal processing unit 212 supplies data indicating the processing result to the recording unit 120 via the signal line 209.

The arbiter 213 arbitrates a request from the pixel array unit 214, and transmits a response to the pixel array unit 214 on the basis of the arbitration result.

[Example Configuration of the Pixel Array Unit]

Figure 4:
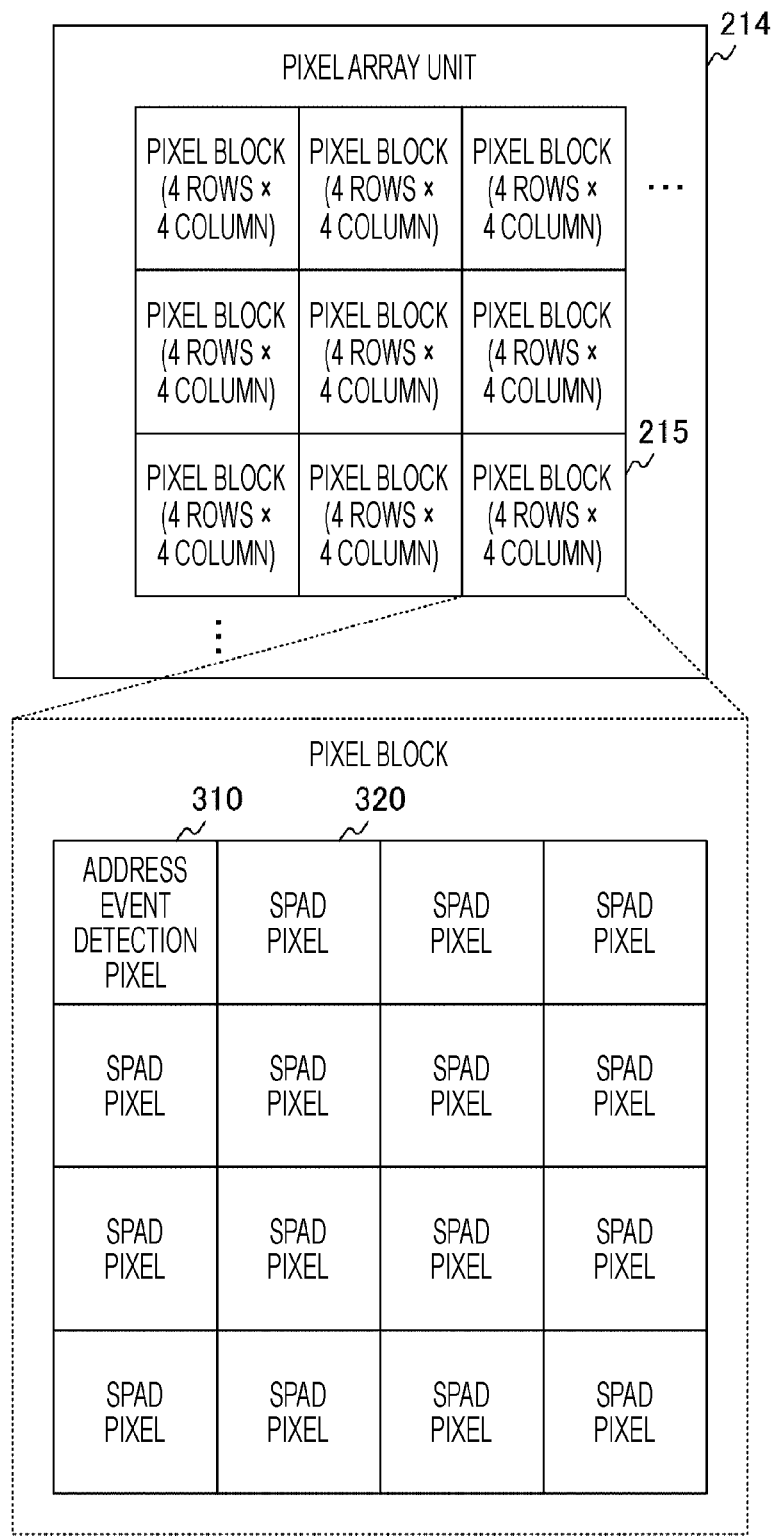
FIG. 4 is a plan view showing an example configuration of a pixel array unit according to the first embodiment of the present technology.

FIG. 4 is a plan view showing an example configuration of the pixel array unit 214 according to the first embodiment of the present technology. In this pixel array unit 214, a plurality of pixel blocks 215 is arranged in a two-dimensional lattice pattern. Further, N (N being an integer of 2 or greater) pixels are arranged in each of the plurality of pixel blocks 215. One of these N pixels is an address event detection pixel 310, and the remaining N−1 pixels are SPAD pixels 320. For example, 16 pixels formed with four rows and four columns are arrayed in each pixel block 215, one of the 16 pixels is an address event detection pixel 310, and the remaining 15 pixels are SPAD pixels 320. This address event detection pixel 310 is disposed at a particular position in the pixel block 215. For example, where the relative coordinates in the pixel block 215 are (x, y), the address event detection pixel 310 is disposed at the coordinates (0, 0). Here, x and y are integers.

Note that the number of pixels in each pixel block 215 is not limited to 16 pixels formed with four rows and four columns. For example, the number of pixels may be four pixels formed with two rows and two columns.

The address event detection pixel 310 detects the presence or absence of an address event, depending on whether or not the amount of change in the amount of incident light exceeds a predetermined threshold. The address event detection pixel 310 also controls the exposure period of the SPAD pixels 320 in a case where an address event has occurred. Note that the address event detection pixel 310 is an example of the detection pixel disclosed in the claims.

The SPAD pixels 320 each count the number of photons that enters during the exposure period, using an avalanche photodiode such as a SPAD, in a case where an address event has occurred. Note that the SPAD pixels 320 are an example of the counting pixel disclosed in the claims.

Figure 5:
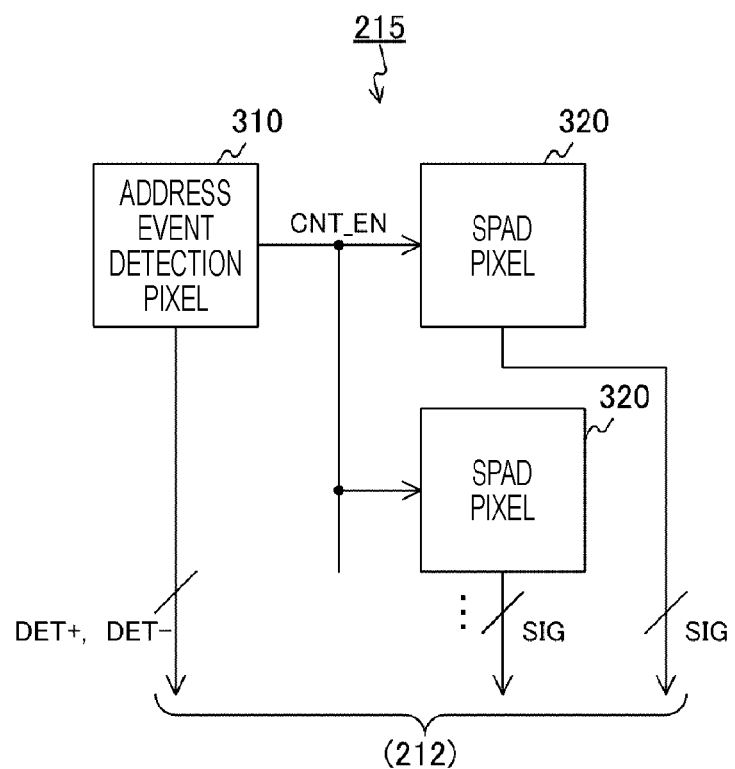
FIG. 5 is a block diagram showing an example configuration of a pixel block according to the first embodiment of the present technology.

FIG. 5 is a block diagram showing an example configuration of a pixel block 215 according to the first embodiment of the present technology. As described above, one address event detection pixel 310 and N−1 SPAD pixels 320 are arrayed in a pixel block 215.

The address event detection pixel 310 outputs detection signals DET+ and DET− indicating a result of address event detection, to the signal processing unit 212. Here, the detection signal DET+ is a signal indicating a result of on-event detection, and the detection signal DET− is a signal indicating a result of off-event detection.

When having detected an address event, the address event detection pixel 310 also generates an enable signal CNT_EN, and supplies the enable signal CNT_EN to each of the N−1 SPAD pixels 320 in the pixel block 215. This enable signal CNT_EN is a control signal indicating a predetermined exposure period. For example, the enable signal CNT_EN is set at high level during the exposure period, and is set at low level outside the exposure period.

Meanwhile, each SPAD pixel 320 counts the number of photons over the exposure period according to the enable signal CNT_EN, generates a digital pixel signal SIG indicating the count value, and outputs the pixel signal SIG to the signal processing unit 212.

As shown in the example in the drawing, when an address event occurs in a certain pixel block 215, the exposure of the N−1 SPAD pixels 320 in the pixel block 215 is started at the same time, and the exposure is ended at the same time. The pixel signal SIG of each of those SPAD pixels 320 is then output. That is, each SPAD pixel 320 generates a pixel signal SIG, the trigger being detection of an address event by the address event detection pixel 310.

Note that the address event detection pixel 310 outputs the detection signals DET+ and DET− to the signal processing unit 212, but may not output these detection signals to the signal processing unit 212.

[Example Configuration of an Address Event Detection Pixel]

Figure 6:
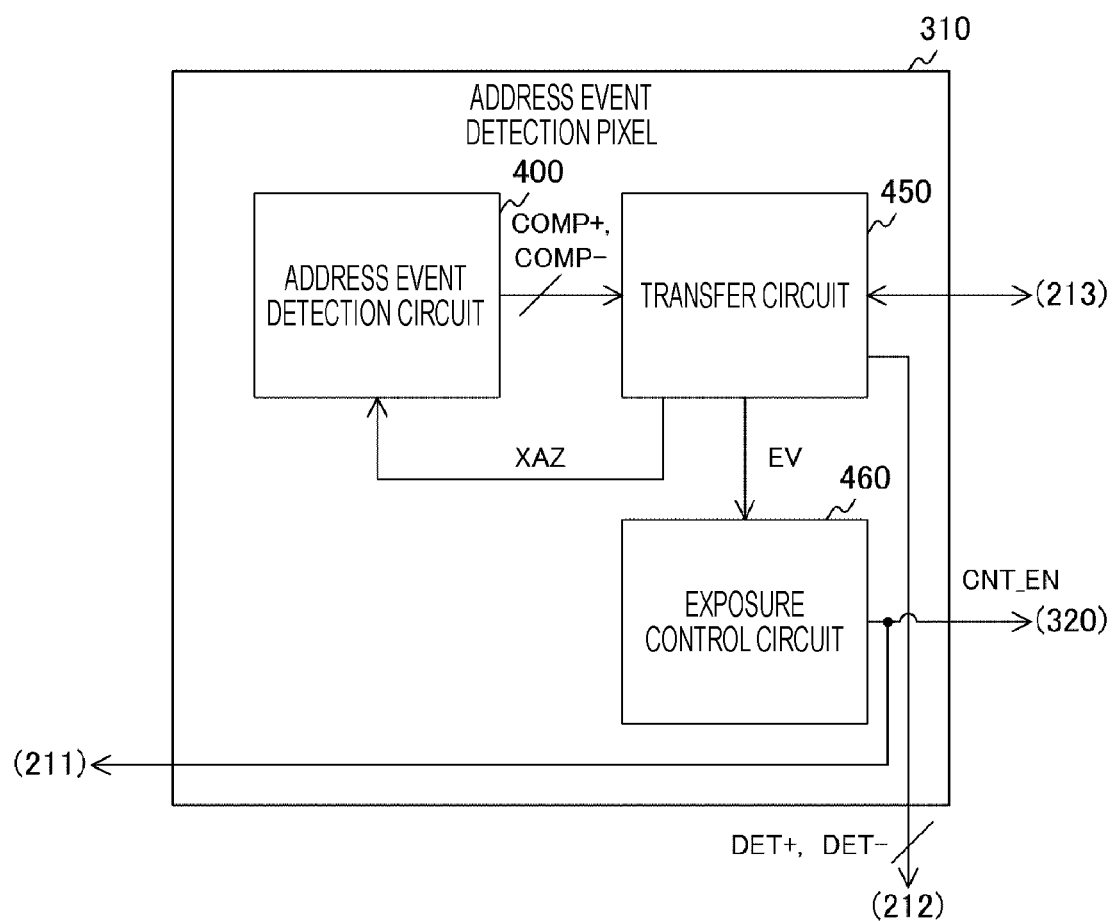
FIG. 6 is a block diagram showing an example configuration of an address event detection pixel according to the first embodiment of the present technology.

FIG. 6 is a block diagram showing an example configuration of an address event detection pixel 310 according to the first embodiment of the present technology. This address event detection pixel 310 includes an address event detection circuit 400, a transfer circuit 450, and an exposure control circuit 460.

The address event detection circuit 400 detects the presence or absence of an address event. This address event detection circuit 400 compares the amount of change in the amount of incident light with thresholds (an upper threshold and a lower threshold), and supplies comparison results COMP+ and COMP− to the transfer circuit 450. The comparison result COMP+ is a result of comparison with the upper threshold, and the comparison result COMP− is a result of comparison with the lower threshold.

The transfer circuit 450 transfers detection signals DET+ and DET− to the signal processing unit 212 in a case where an address event has occurred. The detection signal DET+ indicates a result of on-event detection, and the detection signal DET− indicates a result of off-event detection. The transfer circuit 450 supplies the arbiter 213 with a request for transfer of detection signals when an address event has occurred. Receiving a response from the arbiter 213 to the request, the transfer circuit 450 then transfers the detection signals DET+ and DET− to the signal processing unit 212, generates a detection signal EV, and supplies the detection signal EV to the exposure control circuit 460. This detection signal EV is a signal indicating whether or not an address event has occurred regardless of distinction between an on-event or an off-event, and is generated as the logical sum of the detection signals DET+ and DET−, for example. After receiving the response, the transfer circuit 450 further supplies an auto-zero signal XAZ to the address event detection circuit 400.

The exposure control circuit 460 outputs the enable signal CNT_EN indicating the predetermined exposure period to each of the SPAD pixels 320 in the same pixel block 215 and to the drive circuit 211, in a case where an address event has occurred.

The SPAD pixels 320 count the number of photons entering over the exposure period, and generate pixel signals. When the exposure period ends, the drive circuit 211 further drives the SPAD pixels 320 to output the pixel signals.

Note that the exposure control circuit 460 is disposed in the address event detection pixel 310, but the present technology is not limited to this configuration. For example, the exposure control circuit 460 can be disposed in the drive circuit 211. Further, the transfer circuit 450 is disposed in the address event detection pixel 310, but an OR (logical sum) gate that outputs the logical sum of the comparison results COMP+ and COMP− as the detection signal EV can be provided in place of the transfer circuit 450. In this case, the drive circuit 211 outputs the auto-zero signal XAZ.

[Example Configuration of an Address Event Detection Circuit]

Figure 7:
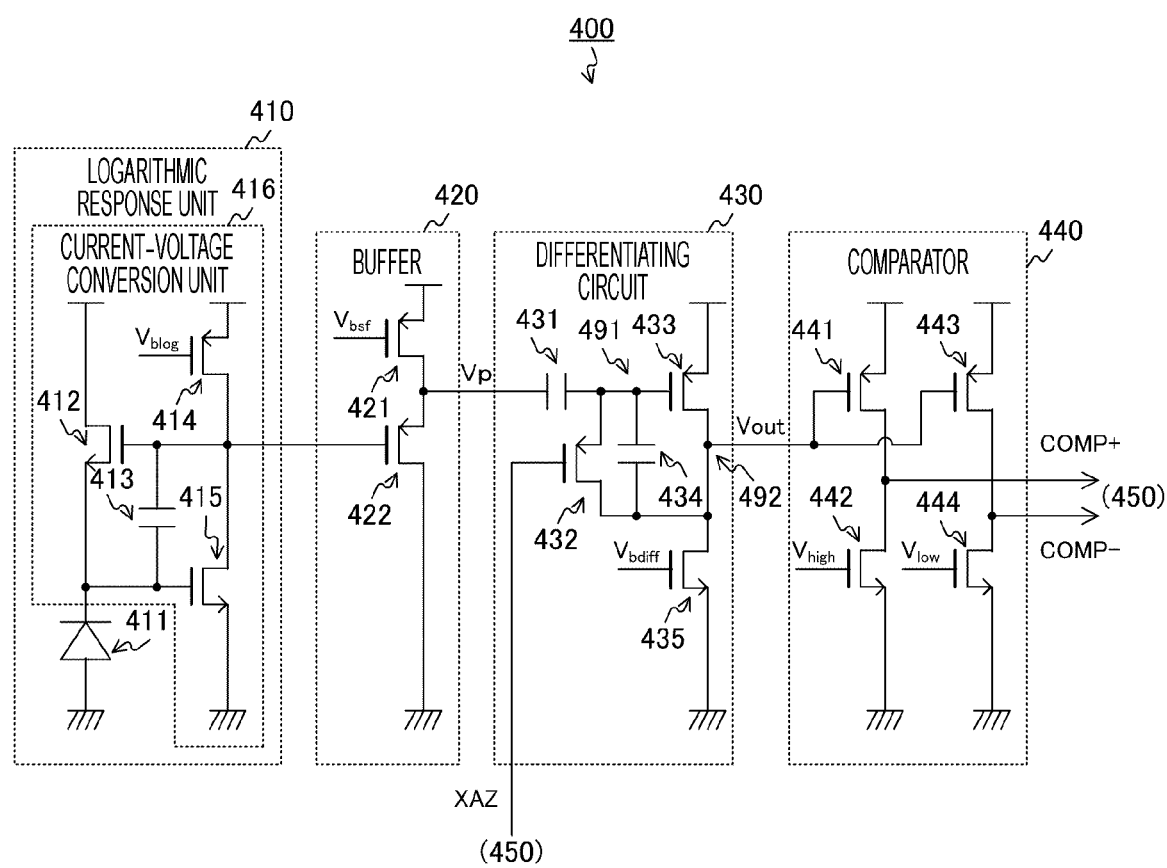
FIG. 7 is a circuit diagram showing an example configuration of an address event detection circuit according to the first embodiment of the present technology.

FIG. 7 is a circuit diagram showing an example configuration of an address event detection circuit 400 according to the first embodiment of the present technology.

A logarithmic response unit 410 includes a photoelectric conversion element 411 and a current-voltage conversion unit 416. The photoelectric conversion element 411 generates a photocurrent by performing photoelectric conversion on incident light. As the photoelectric conversion element 411, a general photodiode that does not have avalanche breakdown is used, for example.

The current-voltage conversion unit 416 logarithmically converts the photocurrent into a pixel voltage Vp. This current-voltage conversion unit 416 includes N-type transistors 412 and 415, a capacitance 413, and a P-type transistor 414. For example, metal-oxide-semiconductor (MOS) transistors are used as the N-type transistor 412, the P-type transistor 414, and the N-type transistor 415.

The source of the N-type transistor 412 is connected to the cathode of the photoelectric conversion element 411, and the drain is connected to the power supply terminal. The P-type transistor 414 and the N-type transistor 415 are connected in series between the power supply terminal and a reference terminal having a predetermined reference potential (such as a ground potential). Further, the connection point between the P-type transistor 414 and the N-type transistor 415 is connected to the gate of the N-type transistor 412 and the input terminal of a buffer 420. The connection point between the N-type transistor 412 and the photoelectric conversion element 411 are connected to the gate of the N-type transistor 415.

Also, a predetermined bias voltage $V_{blog}$ is applied to the gate of the P-type transistor 414. The capacitance 413 is inserted between the gate of the N-type transistor 412 and the gate of the N-type transistor 415.

Further, the photoelectric conversion element 411 is disposed in the light receiving chip 201, and the circuits in the stages that follow are disposed in the circuit chip 202, for example. Note that the circuits and elements disposed in the light receiving chip 201 and the circuit chip 202 are not limited to this configuration. For example, the photoelectric conversion element 411, the N-type transistors 412 and 415, and the capacitance 413 can be disposed in the light receiving chip 201, and the circuits in the stages that follow can be disposed in the circuit chip 202.

The buffer 420 includes P-type transistors 421 and 422. For example, MOS transistors are used as these transistors.

In the buffer 420, the P-type transistors 421 and 422 are connected in series between the power supply terminal and a terminal having the reference potential. Also, the gate of the P-type transistor 422 is connected to the logarithmic response unit 410, and the connection point between the P-type transistors 421 and 422 is connected to a differentiating circuit 430. A predetermined bias voltage Vbsf is applied to the gate of the P-type transistor 421.

The differentiating circuit 430 includes capacitances 431 and 434, P-type transistors 432 and 433, and an N-type transistor 435. For example, MOS transistors are used as the transistors in the differentiating circuit 430.

The P-type transistor 433 and the N-type transistor 435 are connected in series between the power supply terminal and a terminal having the reference potential. A predetermined bias voltage $V_{bdiff}$ is input to the gate of the N-type transistor 435. These transistors function as an inverting circuit that has the gate of the P-type transistor 433 as an input terminal 491, and has the connection point between the P-type transistor 433 and the N-type transistor 435 as an output terminal 492.

The capacitance 431 is inserted between the buffer 420 and the input terminal 491. This capacitance 431 supplies the input terminal 491 with a current corresponding to the time differential (in other words, the amount of change) of the pixel voltage Vp from the buffer 420. Further, the capacitance 434 is inserted between the input terminal 491 and the output terminal 492.

The P-type transistor 432 opens and closes the path between the input terminal 491 and the output terminal 492, in accordance with an auto-zero signal XAZ from the transfer circuit 450. For example, when receiving a low-level auto-zero signal XAZ, the P-type transistor 432 enters an on-state in accordance with the auto-zero signal XAZ, and sets a differential signal Vout to the initial value.

A comparator 440 includes P-type transistors 441 and 443, and N-type transistors 442 and 444. For example, MOS transistors are used as these transistors.

In the comparator 440, the P-type transistor 441 and the N-type transistor 442 are connected in series between the power supply terminal and the reference terminal, and the P-type transistor 443 and the N-type transistor 444 are also connected in series between the power supply terminal and the reference terminal. Further, the gates of the P-type transistors 441 and 443 are connected to the differentiating circuit 430. An upper limit voltage $V_{high}$ indicating the upper threshold is applied to the gate of the N-type transistor 442, and a lower limit voltage $V_{low}$ indicating the lower threshold is applied to the gate of the N-type transistor 444.

The connection point between the P-type transistor 441 and the N-type transistor 442 is connected to the transfer circuit 450, and the voltage at this connection point is output as a result COMP+ of comparison with the upper threshold. The connection point between the P-type transistor 443 and the N-type transistor 444 is also connected to the transfer circuit 450, and the voltage at this connection point is output as a result COMP− of comparison with the lower threshold. With such connections, the comparator 440 outputs a high-level comparison result COMP+ in a case where the differential signal Vout is higher than the upper limit voltage $V_{high}$, and outputs a low-level comparison result COMP− in a case where the differential signal Vout is lower than the lower limit voltage $V_{low}$.

Note that the comparator 440 compares both the upper threshold and the lower threshold with the differential signal Vout, but only one of the thresholds may be compared with the differential signal Vout. In this case, unnecessary transistors can be eliminated. For example, in the case of comparison only with the upper threshold, only the P-type transistor 441 and the N-type transistor 442 are provided.

Figure 8:
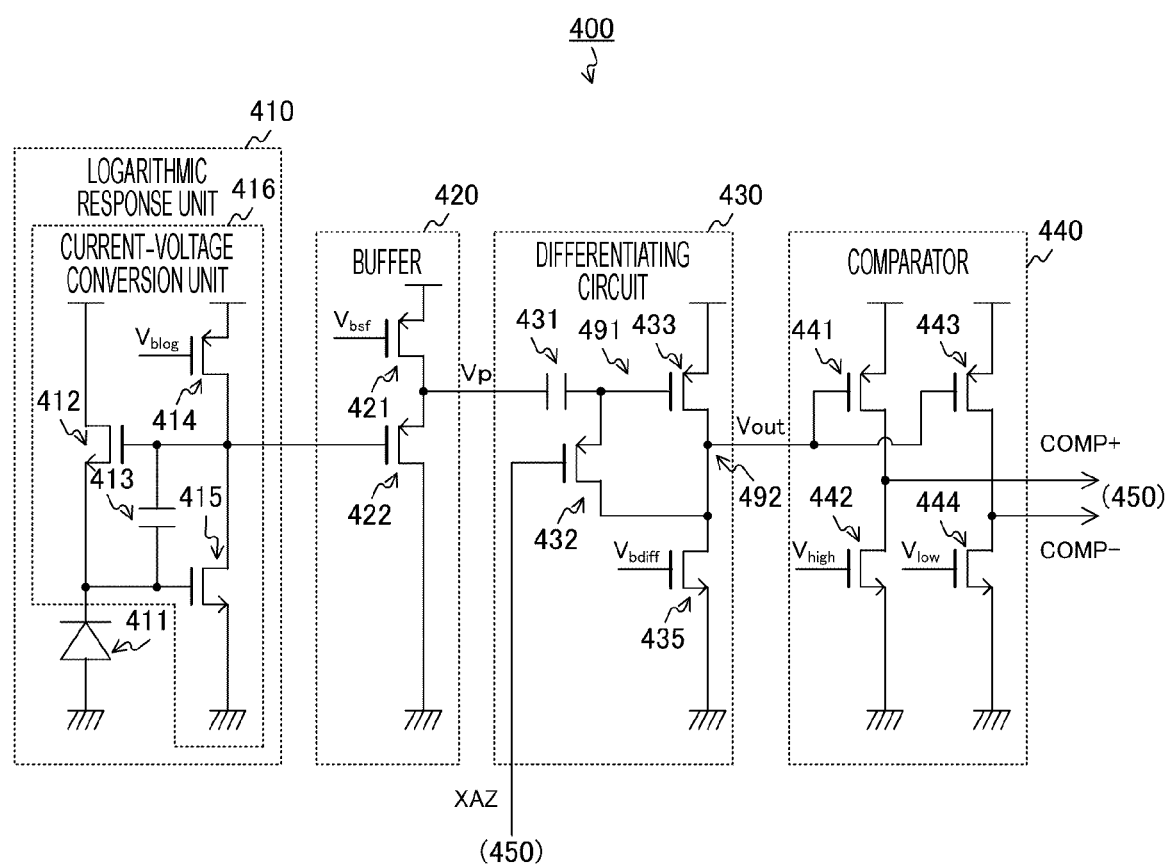
FIG. 8 is a circuit diagram showing an example configuration of an address event detection circuit having its capacitance reduced according to the first embodiment of the present technology.

Further, the capacitance 434 is disposed in the differentiating circuit 430, but the capacitance 434 can be eliminated as in an example shown in FIG. 8.

[Exposure Control Circuit]

Figure 9:
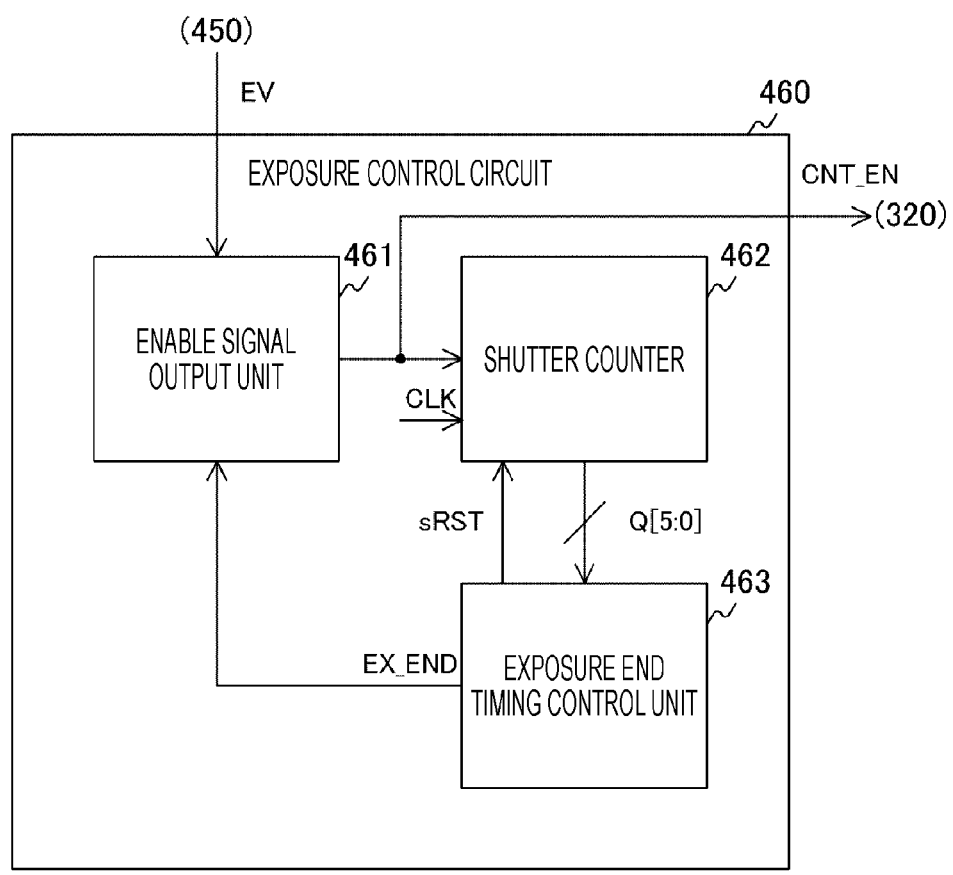
FIG. 9 is a block diagram showing an example configuration of an exposure control circuit according to the first embodiment of the present technology.

FIG. 9 is a block diagram showing an example configuration of an exposure control circuit 460 according to the first embodiment of the present technology. This exposure control circuit 460 includes an enable signal output unit 461, a shutter counter 462, and an exposure end timing control unit 463.

The enable signal output unit 461 outputs a high-level enable signal CNT_EN to the SPAD pixels 320 and the drive circuit 211 in a case where an address event has occurred. When a detection signal EV from the transfer circuit 450 is input, this enable signal output unit 461 starts outputting the high-level enable signal CNT_EN.

When an exposure end signal EX_END from the exposure end timing control unit 463 is input, the enable signal output unit 461 then stops outputting the high-level enable signal CNT_EN. This exposure end signal EX_END is a signal indicating the timing of an end of the exposure period. Note that the enable signal output unit 461 is an example of the control signal output unit disclosed in the claims.

The shutter counter 462 measures the time that has elapsed since the start of the output of the high-level enable signal CNT_EN. This shutter counter 462 measures the count value (in other words, measures the elapsed time) in synchronization with a clock signal CLK of a predetermined frequency within the period during which the high-level enable signal CNT_EN is output. The shutter counter 462 then supplies the count value as a timer value Q to the exposure end timing control unit 463. The shutter counter 462 also sets the timer value Q to the initial value ("0", for example), when a reset signal sRST from the exposure end timing control unit 463 is input. Note that the shutter counter 462 is an example of the timer unit disclosed in the claims.

The exposure end timing control unit 463 stops the output of the high-level enable signal CNT_EN by supplying the exposure end signal EX_END, when the timer value Q matches the length of the exposure period. The exposure end timing control unit 463 also supplies the reset signal sRST to the shutter counter 462 when the timer value Q matches the length of the exposure period. Here, the length of the exposure period is set beforehand, and is held in a register or the like. Note that the exposure period may be changed in accordance with a user operation.

[Example Configuration of an SPAD Pixel]

Figure 10:
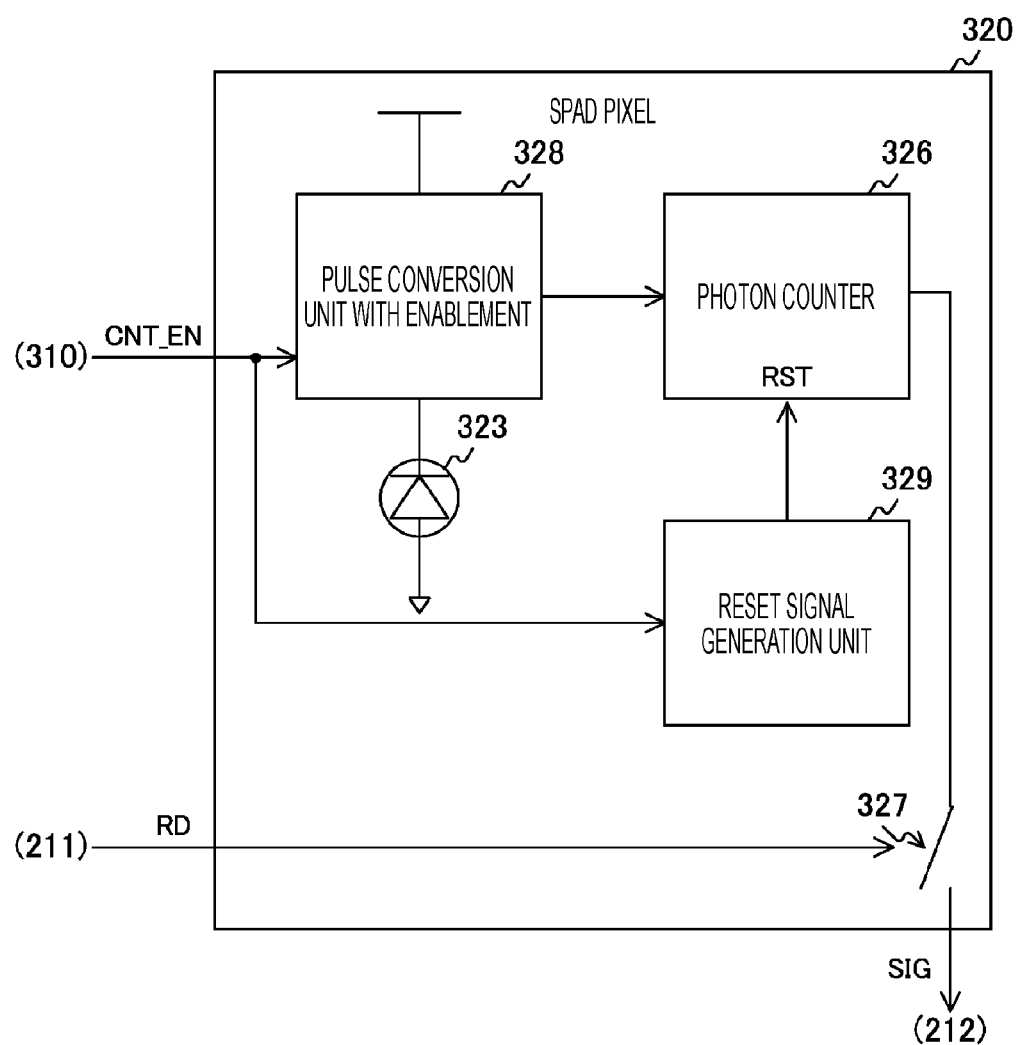
FIG. 10 is a circuit diagram showing an example configuration of a single-photon avalanche diode (SPAD) pixel according to the first embodiment of the present technology.

FIG. 10 is a circuit diagram showing an example configuration of an SPAD pixel 320 according to the first embodiment of the present technology. This SPAD pixel 320 includes a pulse conversion unit 328 with enablement, an avalanche photodiode 323, a photon counter 326, a reset signal generation unit 329, and a switch 327. As the avalanche photodiode 323, an SPAD is used, for example.

The pulse conversion unit 328 with enablement and the avalanche photodiode 323 are connected in series between the power supply terminal and a reference terminal having the reference potential (such as the ground potential). Note that the pulse conversion unit 328 with enablement is disposed on the power supply side, and the avalanche photodiode 323 is disposed on the ground side, but the configuration is not limited to this. The pulse conversion unit 328 with enablement can be disposed on the ground side, and the avalanche photodiode 323 can be arranged on the power supply side.

In accordance with an enable signal CNT_EN from the address event detection pixel 310, the pulse conversion unit 328 with enablement generates a pulse signal every time a photocurrent flows into the avalanche photodiode 323, and outputs the pulse signal to the photon counter 326. This pulse conversion unit 328 with enablement generates a pulse signal in a case where the enable signal CNT_EN is at high level, and stops the pulse signal generation in a case where the enable signal CNT_EN is at low level. Note that the pulse conversion unit 328 with enablement is an example of the pulse conversion unit disclosed in the claims.

The avalanche photodiode 323 photoelectrically converts incident light, and amplifies the photocurrent.

The photon counter 326 measures the count value in synchronization with a signal supplied from an inverting circuit. The reset signal generation unit 329 generates a reset signal and initializes the count value of the photon counter 326, when the pulse conversion unit 328 with enablement is in a disabled state. The switch 327 outputs a pixel signal SIG supplied from the photon counter 326 to the signal processing unit 212, in accordance with a drive signal RD supplied from the drive circuit 211. Note that the reset signal generation unit 329 is disposed in the SPAD pixel 320, but the reset signal generation unit 329 may not be provided in the SPAD pixel 320. In this case, an external circuit such as the drive circuit 211 should generate a reset signal.

In the above configuration, the pulse conversion unit 328 with enablement generates a pulse signal and outputs the pulse signal to the photon counter 326 every time a photon enters during the exposure period. The photon counter 326 counts the number of times a pulse signal is output. This count value indicates the number of photons that have entered during the exposure period. The photon counter 326 then outputs a digital pixel signal SIG indicating the count value to the signal processing unit 212 via the switch 327. The reset signal generation unit 329 also sets the count value to the initial value when a low-level enable signal CNT_EN is input.

Figure 11:
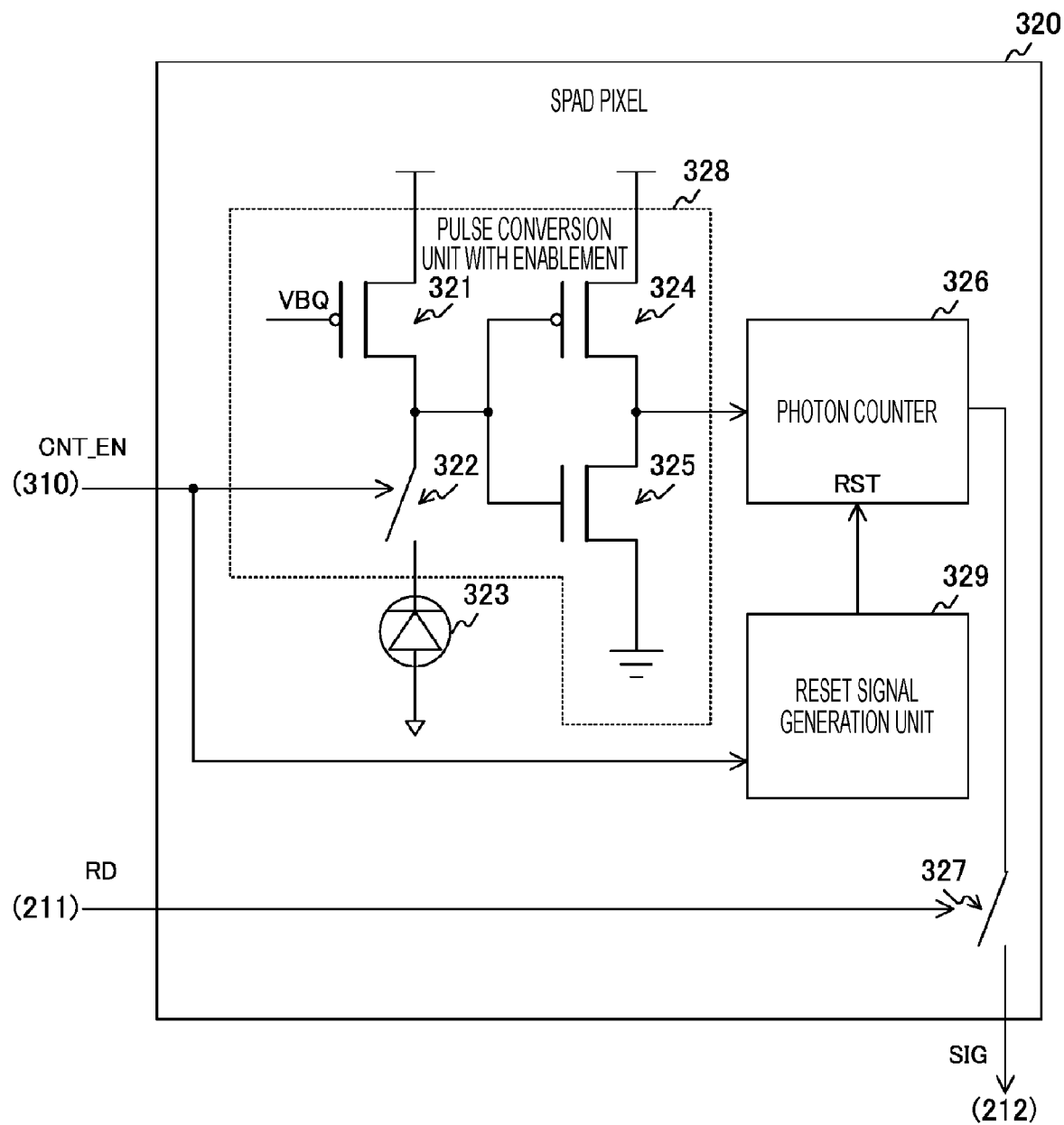
FIG. 11 is a circuit diagram showing an example configuration example of a pulse conversion unit with enablement according to the first embodiment of the present technology.

FIG. 11 is a circuit diagram showing an example configuration example of a pulse conversion unit 328 with enablement according to the first embodiment of the present technology. This pulse conversion unit 328 with enablement includes a P-type transistor 321, a switch 322, a P-type transistor 323, and an N-type transistor 324. For example, MOS transistors are used as the P-type transistor 321, the P-type transistor 324, and the N-type transistor 325.

The P-type transistor 321 is connected in series to the avalanche photodiode 323 via the switch 322. Meanwhile, the switch 322 is inserted between the P-type transistor 321 and the avalanche photodiode 323. Further, a predetermined bias voltage VBQ is applied to the gate of the P-type transistor 321. With this arrangement, the P-type transistor 321 functions as a resistance element. Note that the P-type transistor 321 is an example of the resistance element disclosed in the claims.

The P-type transistor 324 and the N-type transistor 325 are connected in series between the power supply terminal and the reference terminal. Further, the respective gates of the P-type transistor 324 and the N-type transistor 325 are both connected to the connection point between the P-type transistor 321 and the switch 322. The connection point between the P-type transistor 324 and the N-type transistor 325 are connected to the input terminal of the photon counter 326. With this connection, the P-type transistor 324 and the N-type transistor 325 function as an inverting circuit that inverts the potential at the connection point between the P-type transistor 321 and the switch 322. Note that any inverting circuit may not be provided in the pulse conversion unit 328 with enablement. In this case, the photon counter 326 performs counting every time the potential at the connection point between the P-type transistor 321 and the switch 322 drops.

The switch 322 opens and closes the path between the P-type transistor 321 and the avalanche photodiode 323, in accordance with an enable signal CNT_EN supplied from the address event detection pixel 310. This switch 322 enters an open state at high level, and enters a closed state at low level.

Figure 12:
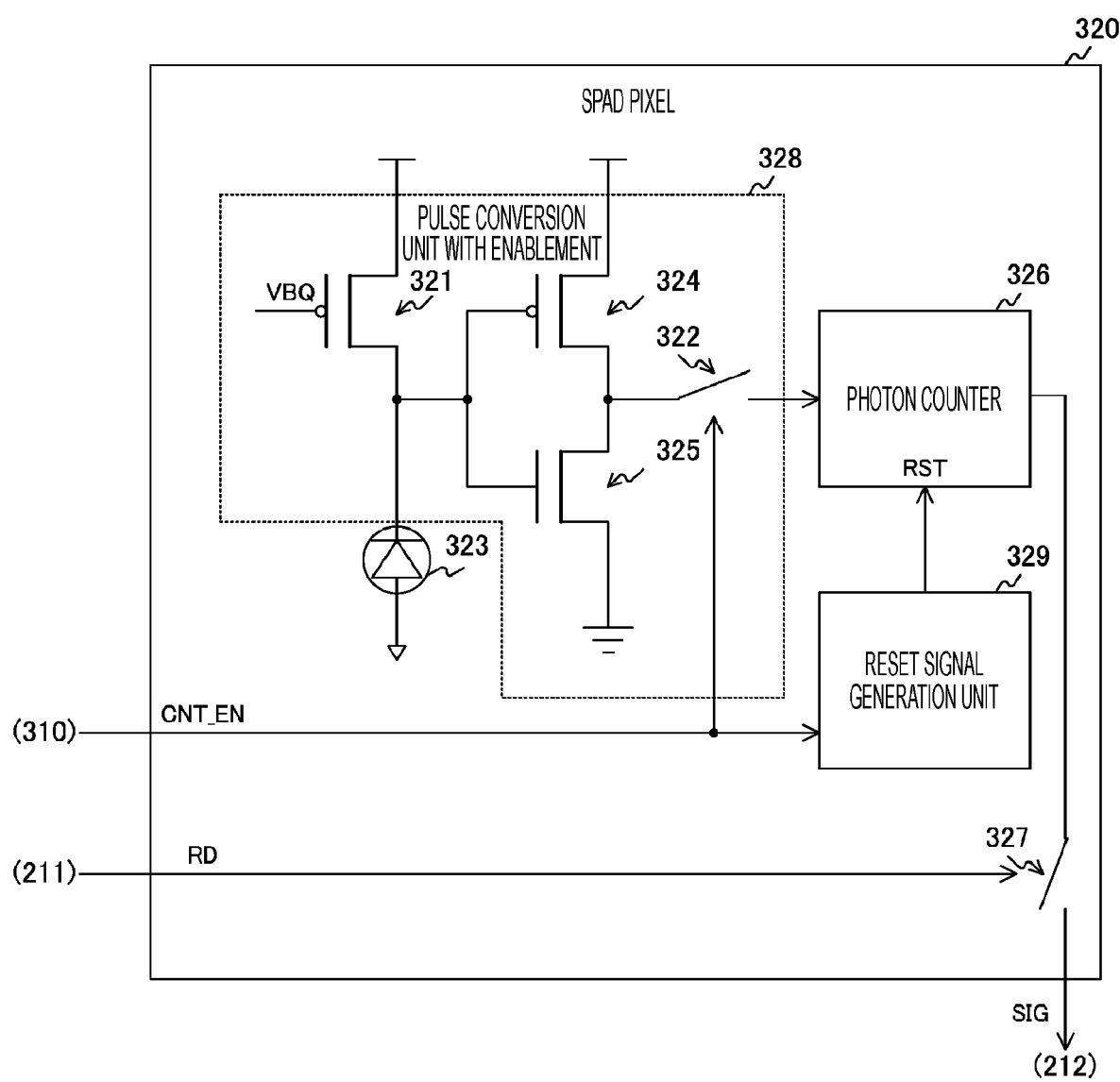
FIG. 12 is a circuit diagram showing an example configuration of an SPAD pixel that has the position of a switch changed in the first embodiment of the present technology.

Note that the switch 322 is inserted between the P-type transistor 321 and the avalanche photodiode 323, but the configuration is not limited to this. For example, as in an example illustrated in FIG. 12, the switch 322 can be inserted between the connection point between the P-type transistor 324 and the N-type transistor 325, and the photon counter 326.

[Example Operation of the Solid-State Imaging Device]

Figure 13:
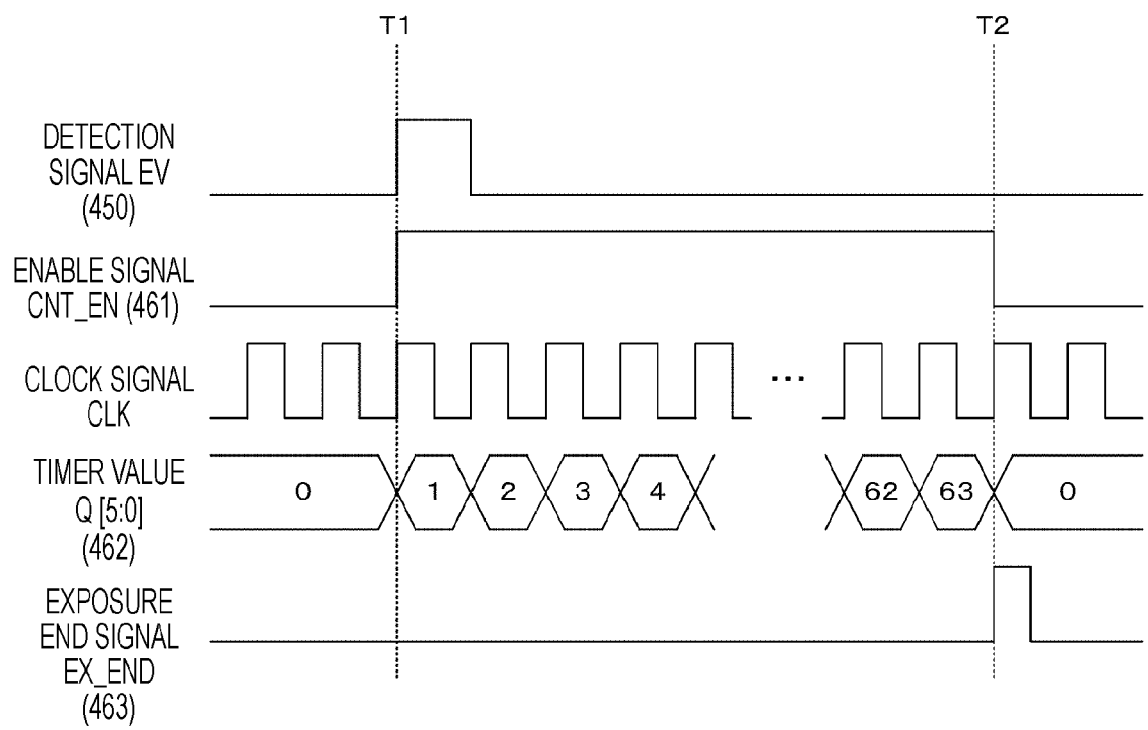
FIG. 13 is a timing chart showing an example of exposure control according to the first embodiment of the present technology.

FIG. 13 is a timing chart showing an example of exposure control according to the first embodiment of the present technology. In this example, an address event occurs, and the transfer circuit 450 outputs a high-level detection signal EV over a predetermined pulse period starting from timing T1.

The enable signal output unit 461 in the exposure control circuit 460 starts outputting a high-level enable signal CNT_EN to the SPAD pixels 320. Also, the shutter counter 462 starts measuring a 6-bit timer value Q. At timing T2 when the timer value Q reaches the length of the exposure period ("63", for example), the exposure end timing control unit 463 outputs an exposure end signal EX_END. As a result, the enable signal output unit 461 stops the output of the high-level enable signal CNT_EN.

As described above, when an address event occurs in a certain pixel block 215, the exposure of the SPAD pixels 320 in the block is started at the same time. After a certain exposure period of time has passed, the exposure of the SPAD pixels 320 then ends at the same time. Within that exposure period, each of the SPAD pixels 320 counts the number of incident photons, and generates a pixel signal SIG. When the exposure period ends, the drive circuit 211 then causes the SPAD pixels 320 to sequentially output the respective pixel signals SIG, using a drive signal RD. Note that the exposure control circuit 460 is not limited to the example configuration shown in FIG. 9, as long as the control illustrated in FIG. 12 can be performed.

Here, it is also possible to adopt a configuration in which a circuit that transfers electric charges to the floating diffusion layer and performs analog-to-digital (AD) conversion on the potential with a single-slope analog-to-digital converter (ADC) is disposed in place of the SPAD pixels 320. With this configuration, however, the error of integral non-linearity (INL) is greater than that with the SPAD pixels 320. Also, there is a possibility that noise will occur and photo response non-uniformity (PRNU) will deteriorate, resulting in degradation of signal quality. Therefore, the SPAD pixels 320 are provided, so that the solid-state imaging device 200 can generate pixel signals having a high signal quality with less noise or the like.

Further, the drive circuit 211 outputs (in other words, reads out) only the pixel signals in the blocks in which an address event has occurred among the plurality of pixel blocks 215. Accordingly, power consumption and the processing amount of the signal processing for the pixel signals can be made smaller than those in a case where pixel signals in all the blocks are read out.

Figure 14:
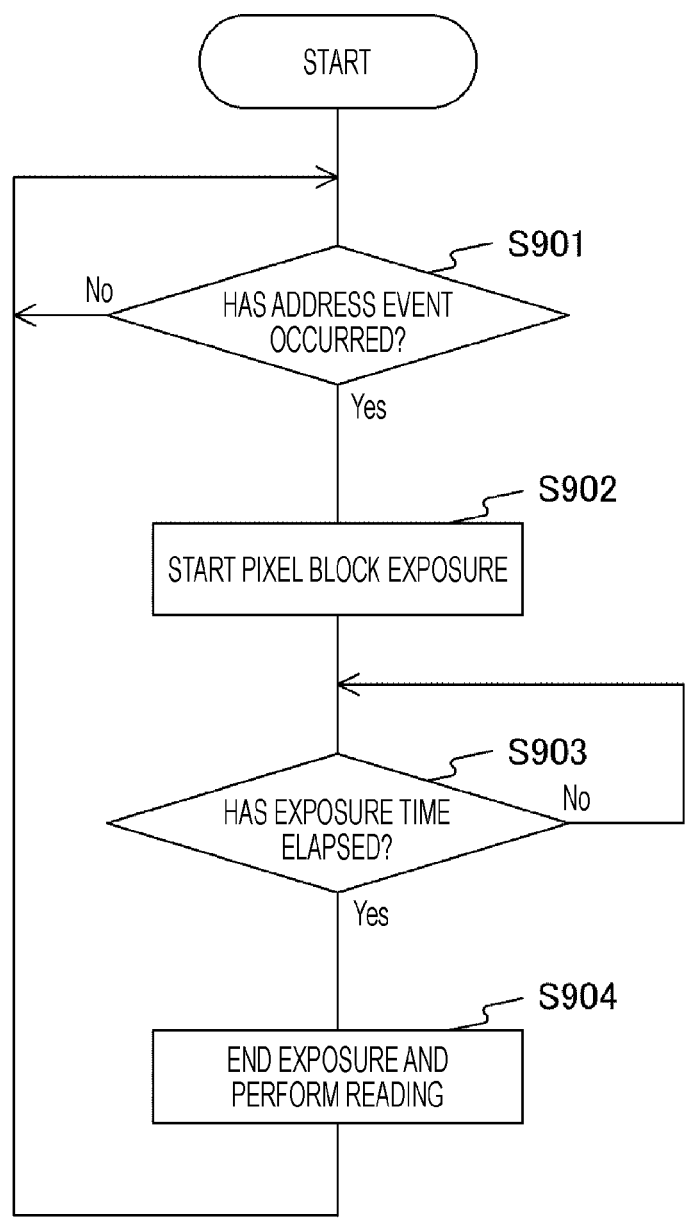
FIG. 14 is a flowchart showing an example operation of the solid-state imaging device according to the first embodiment of the present technology.

FIG. 14 is a flowchart showing an example operation of the solid-state imaging device 200 according to the first embodiment of the present technology. This operation is started when an application for detecting the presence or absence of an address event is executed, for example.

The address event detection pixel 310 in each pixel block 215 in the solid-state imaging device 200 determines whether or not an address event has occurred (step S901). If any address event has not occurred in any of the pixel blocks 215 (step S901: No), the address event detection pixel 310 repeats step S901 and the steps that follow.

If an address event has occurred in one or more pixel blocks 215 (step S901: Yes), on the other hand, the exposure control circuit 460 in the address event detection pixel 310 starts exposure of the pixel block 215 (step S902).

The exposure control circuit 460 determines whether or not a certain exposure time has elapsed (step S903). If the exposure time has not elapsed (step S903: No), the exposure control circuit 460 repeats step S903 and the steps that follow.

If the certain exposure time has elapsed (step S903: Yes), on the other hand, the exposure control circuit 460 ends the exposure, and the drive circuit 211 reads out the pixel signal (step S904). After step S904, the solid-state imaging device 200 repeatedly carries out step S901 and the steps that follow.

As described above, according to the first embodiment of the present technology, each SPAD pixel 320 generates a pixel signal, detection of an address event by the address event detection pixel 310 being a trigger. Thus, an image can be captured from image data, while address events are detected. Further, each SPAD pixel 320 counts the number of photons entering during the exposure period, and generates a pixel signal. Thus, signal quality can be made higher than that of conventional pixels using a floating diffusion layer or the like.

[First Modification]

In the first embodiment described above, an address event detection pixel 310 is provided for each pixel block 215 formed with four rows and four columns. In this configuration, however, there is a possibility that the pixel density of the address event detection pixel 310 in the column direction will become too low. A first modification of the first embodiment differs from the first embodiment in that address event detection pixels 310 are aligned in the column direction.

Figure 15:
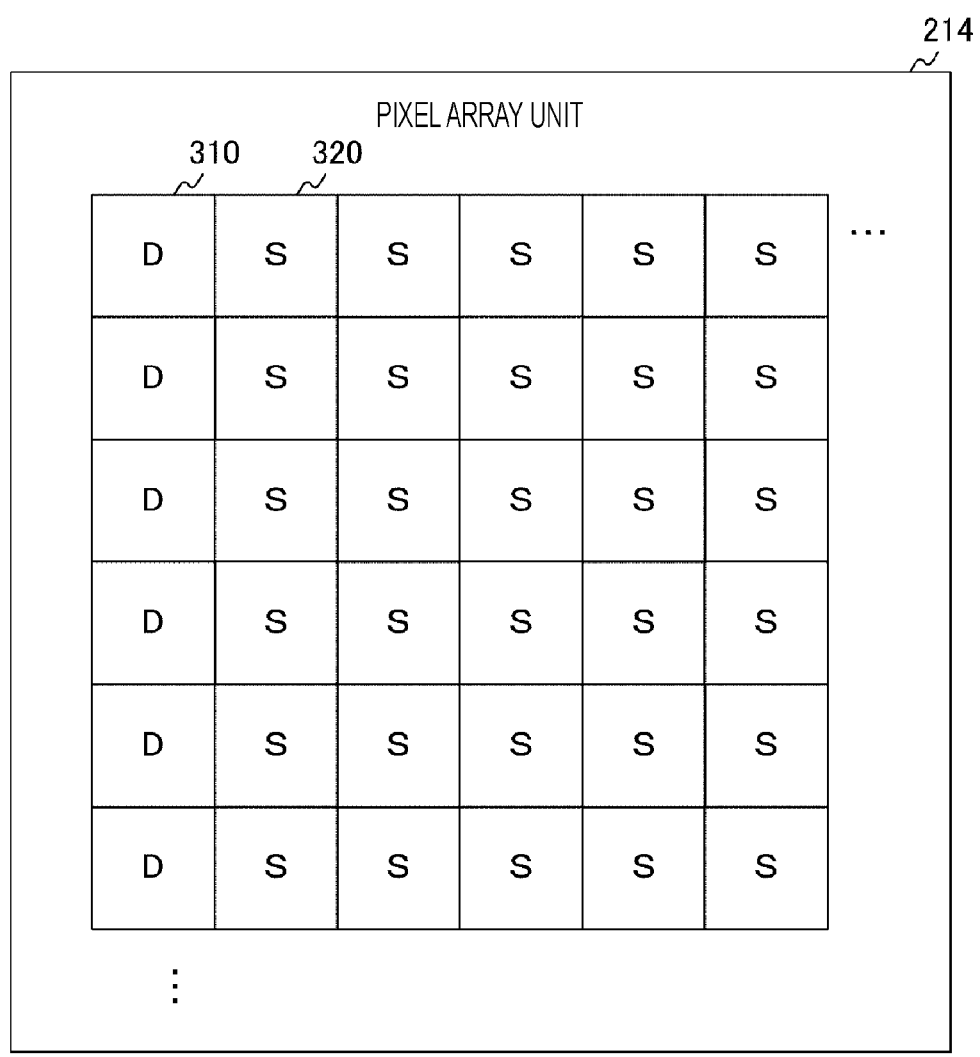
FIG. 15 is a plan view showing an example configuration of a pixel array unit according to a first modification of the first embodiment of the present technology.

FIG. 15 is a plan view showing an example configuration of a pixel array unit 214 according to the first modification of the first embodiment of the present technology. In this pixel array unit 214 of the first modification of the first embodiment, address event detection pixels 310 are aligned in one column in the column direction, and SPAD pixels 320 are arranged in a two-dimensional lattice pattern. In this drawing, each "D" indicates an address event detection pixel 310 for realizing the functions as a DVS, and each "S" indicates a SPAD pixel 320. Note that the number of columns of the address event detection pixels 310 is not necessarily one, and may be two or larger. Alternatively, the address event detection pixels 310 can be aligned in the row direction.

When an address event is detected from a row, exposure of all the SPAD pixels 320 in that row is started, and the pixel signals of the one row are read out. As the address event detection pixels 310 are aligned in the column direction, the number of pixels of the address event detection pixels 310 in the column direction can be made larger than that in the first embodiment.

As described above, according to the first modification of the first embodiment of the present technology, the address event detection pixels 310 are aligned in one column in the column direction, and thus, the number of pixels of the address event detection pixels 310 in the column direction can be increased.

[Second Modification]

In the first embodiment described above, the pixel size of the address event detection pixels 310 is the same as that of the SPAD pixels 320. However, the circuit sizes differ between the address event detection pixels 310 and the SPAD pixels 320, and therefore, it is difficult to efficiently arrange the circuits and elements if the pixel sizes are the same. A solid-state imaging device 200 of a second modification of the first embodiment differs from the first embodiment in that the pixel size of the address event detection pixels 310 is made larger than that of the SPAD pixels 320.

Figure 16:
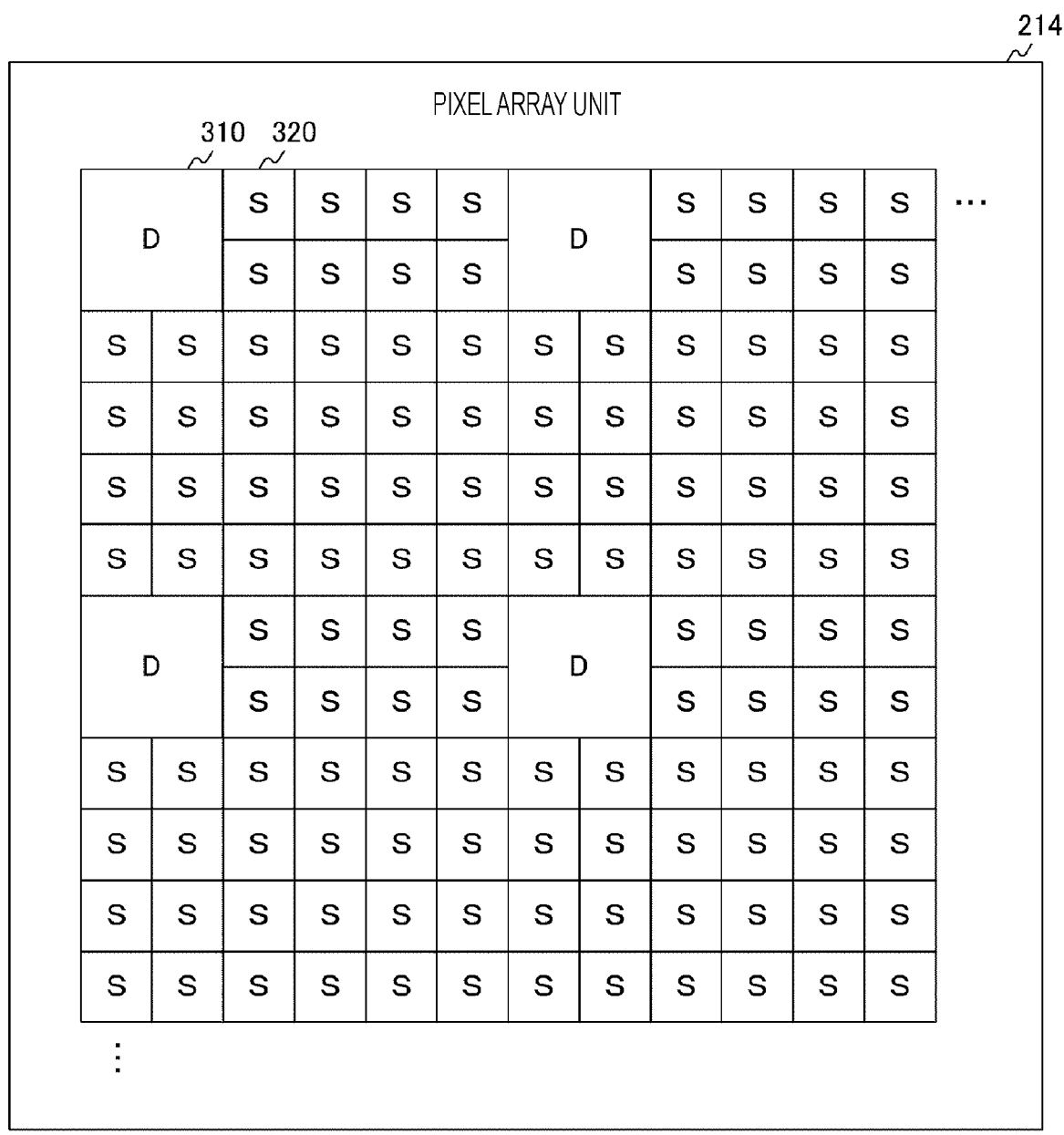
FIG. 16 is a plan view showing an example configuration of a pixel array unit according to a second modification of the first embodiment of the present technology.
Figure 17:
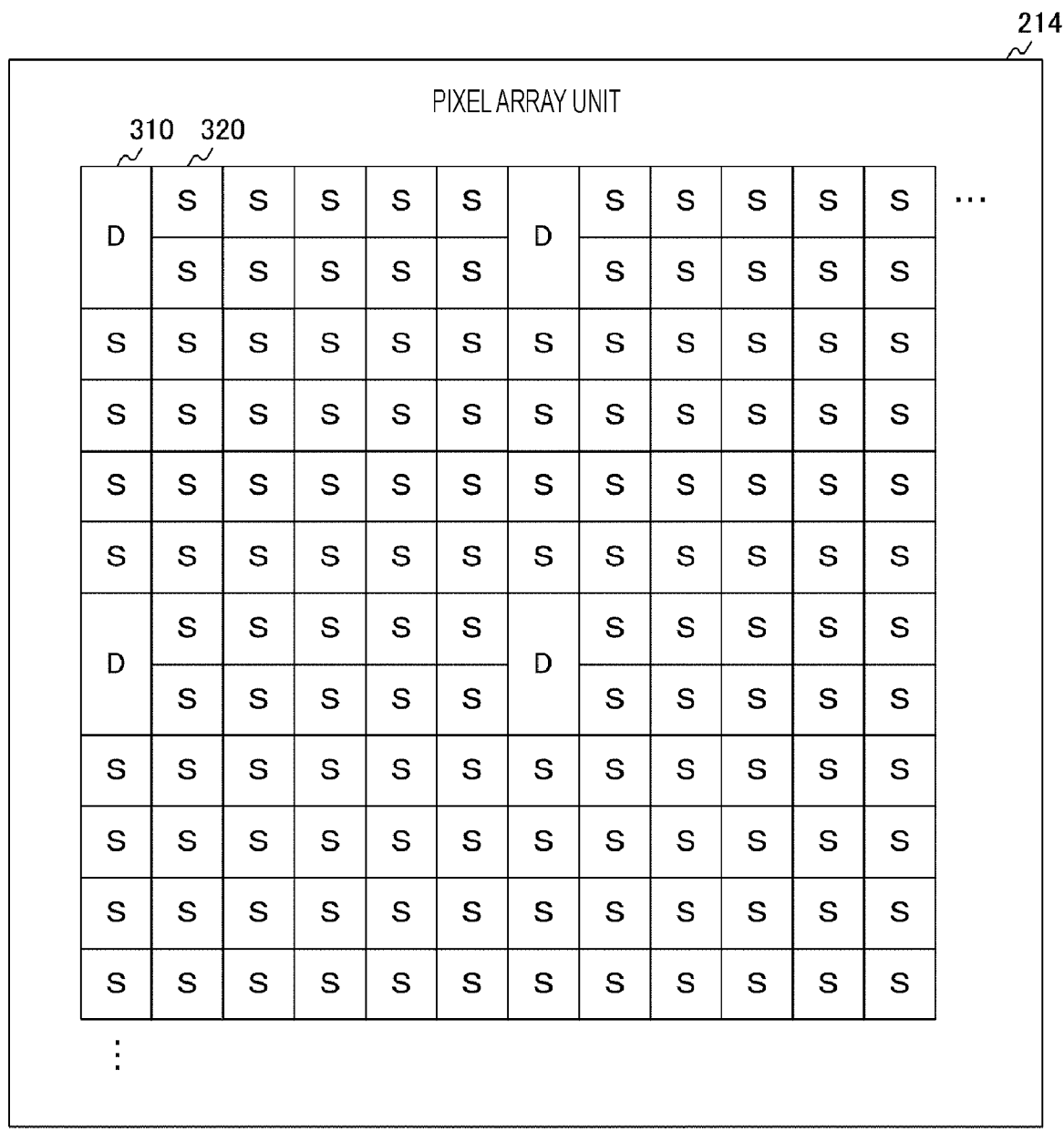
FIG. 17 is a plan view showing an example configuration of a pixel array unit according to the second modification of the first embodiment of the present technology.

FIG. 16 is a plan view showing an example configuration of a pixel array unit 214 according to the second modification of the first embodiment of the present technology. In the second modification of the first embodiment, the pixel size of the address event detection pixels 310 is larger than that of the SPAD pixels 320 in the horizontal and vertical directions. Note that, as shown in an example in FIG. 17, the pixel size of the address event detection pixels 310 can be made larger than that of the SPAD pixels 320 only in the column direction.

As described above, according to the second modification of the first embodiment of the present technology, the pixel size of the address event detection pixels 310 is made larger than that of the SPAD pixels 320, and thus, the circuits and elements can be arranged more efficiently than in a case where the pixel sizes of these pixels are the same.

2. Second Embodiment

In the first embodiment described above, the solid-state imaging device 200 starts reading pixel signals when a certain exposure period of time has elapsed. However, if an address event is detected during the reading, the next exposure will be started, and there is a possibility that the pixel signals will be initialized before the output of the pixel signals by the previous exposure is completed. A solid-state imaging device 200 of a second embodiment differs from the first embodiment in that exposure is not started during reading.

Figure 18:
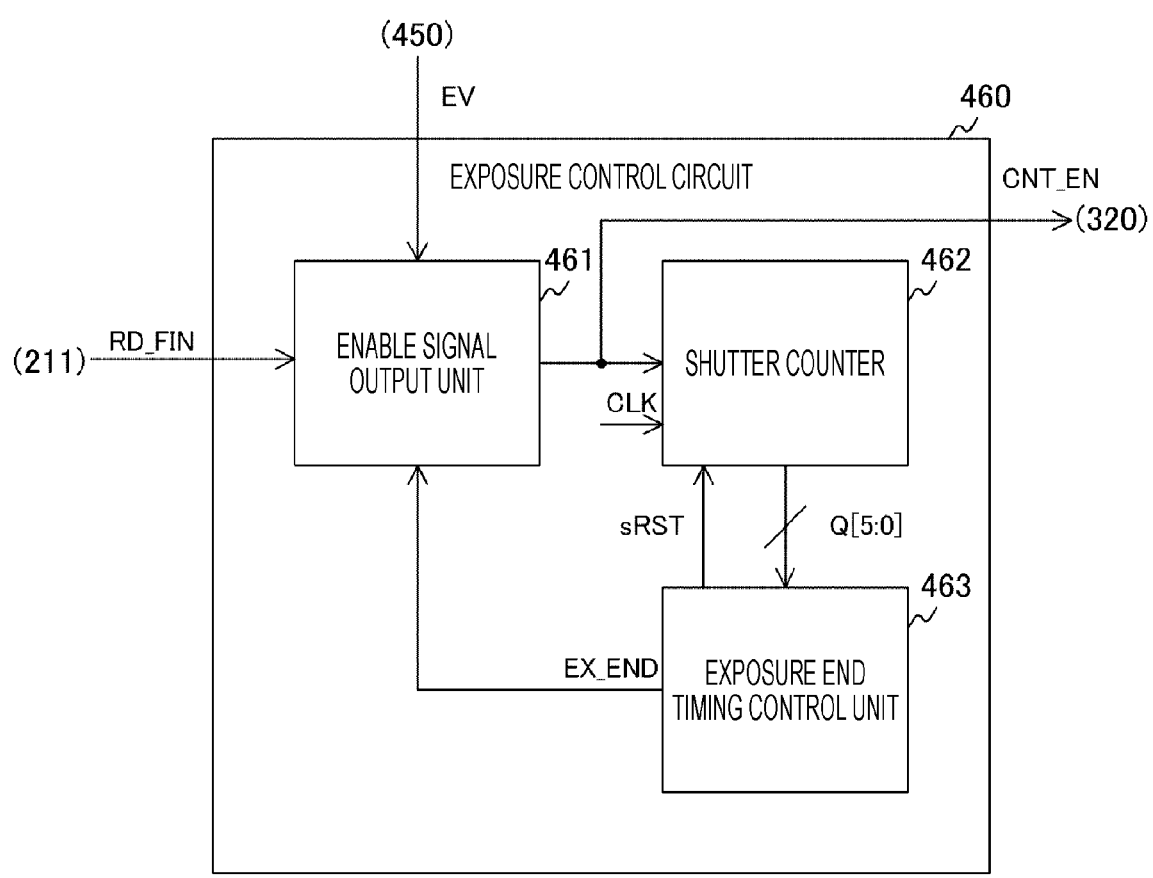
FIG. 18 is a block diagram showing an example configuration of an exposure control circuit according to a second embodiment of the present technology.

FIG. 18 is a block diagram showing an example configuration of an exposure control circuit 460 according to the second embodiment of the present technology. A read end signal RD_FIN from the drive circuit 211 is further input to an enable signal output unit 461 of the second embodiment. This read end signal RD_FIN is a signal indicating the timing at which pixel signal reading is completed.

When the exposure period of time has elapsed, the drive circuit 211 of the second embodiment reads N−1 pixel signals in order over a certain reading period. When the reading is completed, the read end signal RD_FIN is then supplied to the exposure control circuit 460.

Meanwhile, the exposure control circuit 460 sets an enable signal CNT_EN at low level so as not to allow exposure to be started during the period from the input of an exposure end signal EX_END to the input of the read end signal RD_FIN, regardless of the presence or absence of a detection signal EV.

Figure 19:
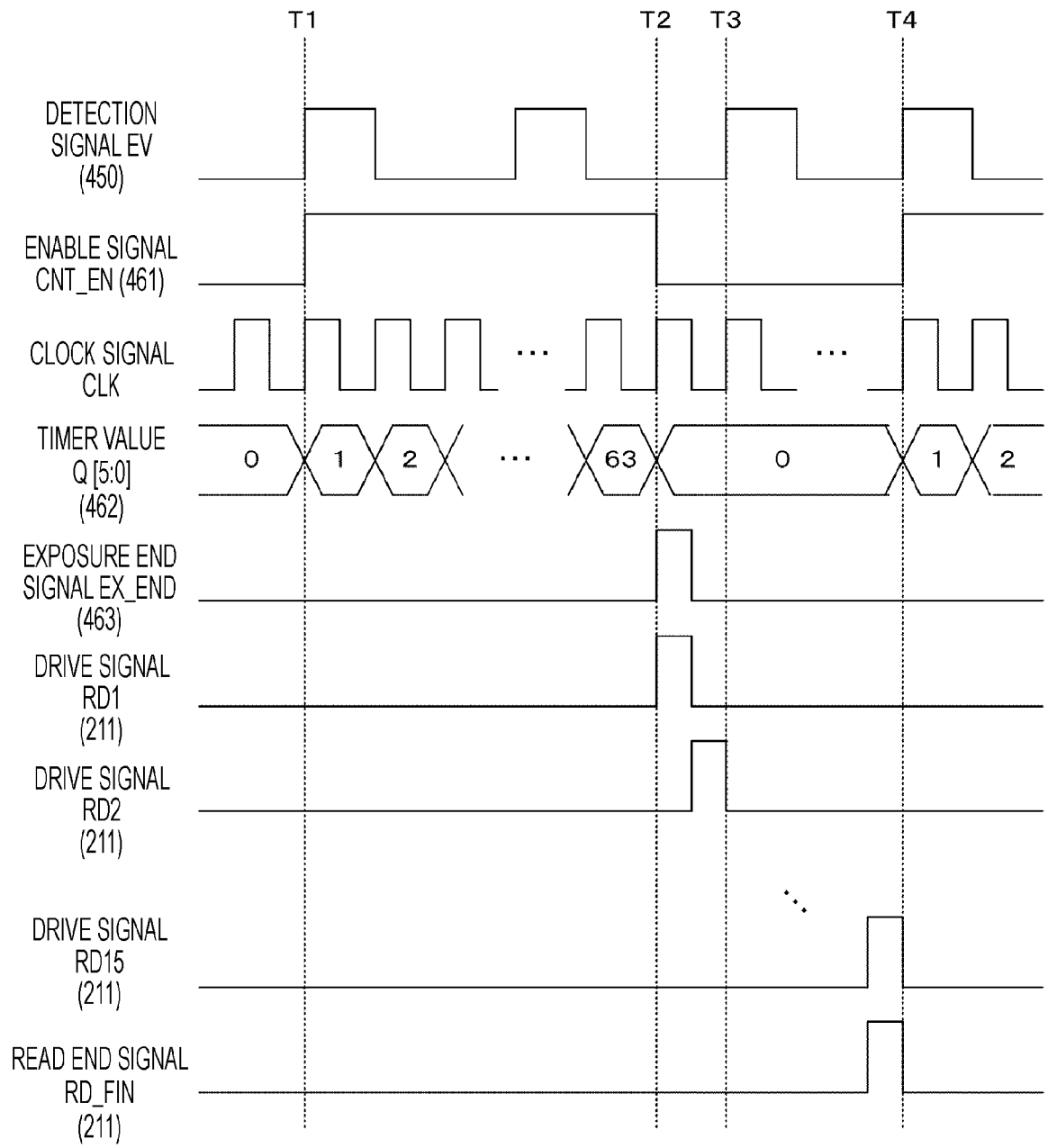
FIG. 19 is a timing chart showing an example of exposure and readout control according to the second embodiment of the present technology.

FIG. 19 is a timing chart showing an example of exposure and readout control according to the second embodiment of the present technology. In this example, an address event occurs, and a detection signal EV is input to the exposure control circuit 460 at timing T1.

The enable signal output unit 461 in the exposure control circuit 460 starts outputting a high-level enable signal CNT_EN to the SPAD pixels 320. Also, the shutter counter 462 starts measuring a timer value Q. At the timing T2 at which the exposure period ends, the exposure end timing control unit 463 outputs the exposure end signal EX_END.

As a result, the enable signal output unit 461 stops the output of the high-level enable signal CNT_EN.

During the reading period from timing T2, at which the exposure ends, to timing T4, the drive circuit 211 outputs drive signals RD1 to RD15, so that the 15 SPAD pixels 320 in a pixel block 215 in which an address event has occurred sequentially outputs the respective pixel signals. A high-level read end signal RD_FIN is then supplied to the enable signal output unit 461 over the pulse period, starting immediately before timing T4.

Meanwhile, the enable signal output unit 461 sets the enable signal CNT_EN at low level during the period from the exposure end timing T2 to the read end timing T4. Even if a detection signal EV is input at timing T3 or the like within this period, the enable signal output unit 461 does not output the high-level enable signal CNT_EN, and does not allow exposure to be started. Thus, the next exposure can be prevented from being started during the reading, and all the pixel signals in the pixel block 215 can be read out without fail.

Note that each of the first and second modifications of the first embodiment can be applied to the solid-state imaging device 200 of the second embodiment.

As described above, according to the second embodiment of the present technology, the enable signal output unit 461 stops the output of the high-level enable signal CNT_EN during the reading period of pixel signals, so that the next exposure can be prevented from being started during the reading. Thus, all the pixel signals in the pixel block 215 can be read out without fail.

3. Third Embodiment

In the first embodiment described above, the exposure control circuit 460 measures the time that has elapsed since the start of exposure, using the shutter counter 462. In this configuration, however, the circuit size of the exposure control circuit 460 might increase with the bit depth of the shutter counter 462. An exposure control circuit 460 of a third embodiment differs from the first embodiment in that two clock signals with different phases are used to reduce the circuit size.

Figure 20:
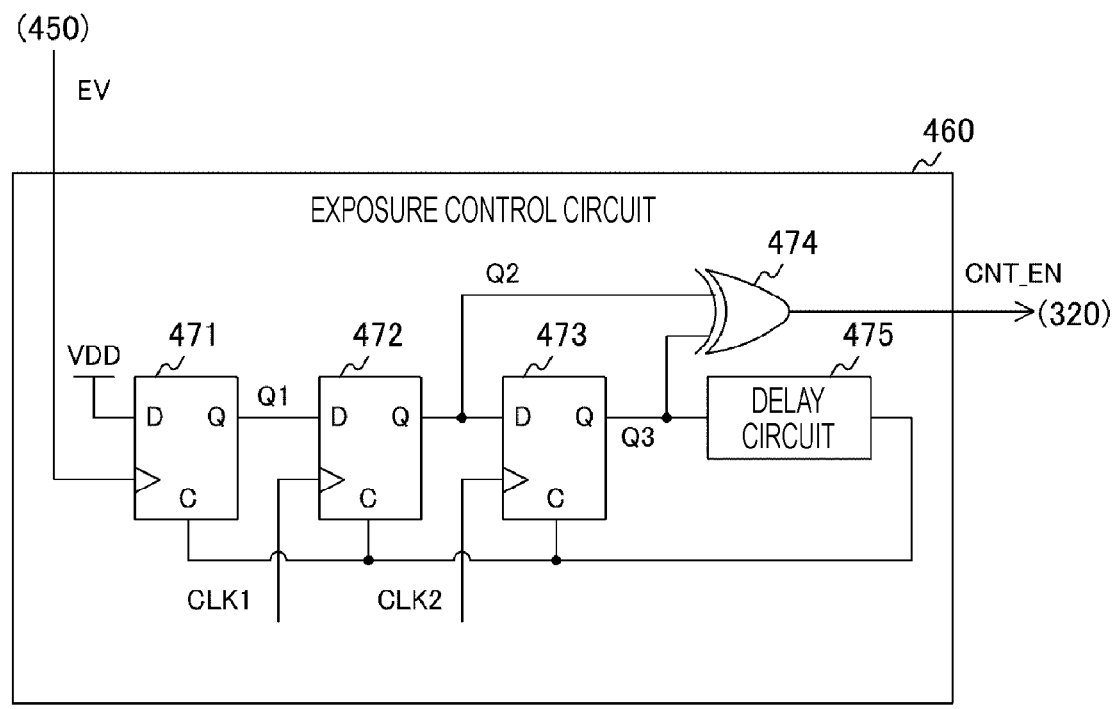
FIG. 20 is a circuit diagram showing an example configuration of an exposure control circuit according to a third embodiment of the present technology.

FIG. 20 is a circuit diagram showing an example configuration of an exposure control circuit 460 according to the third embodiment of the present technology. This exposure control circuit 460 of the third embodiment includes flip-flops 471, 472, and 473, an XOR (exclusive OR) gate 474, and a delay circuit 475.

The flip-flop 471 holds an input signal in synchronization with a detection signal EV. A high-level input signal from the power supply terminal is input to the input terminal D of the flip-flop 471. Also, A held value Q1 from the output terminal Q of the flip-flop 471 is input to the input terminal D of the flip-flop 472.

The flip-flop 472 holds the held value Q1 from the previous stage in synchronization with a clock signal CLK1. A held value Q2 from the output terminal Q of the flip-flop 472 is input to the input terminal D of the flip-flop 473 and the XOR gate 474.

The flip-flop 473 holds the held value Q2 from the previous stage in synchronization with a clock signal CLK2. A held value Q3 from the output terminal Q of the flip-flop 473 is input to the XOR gate 474 and the delay circuit 475. Further, the clock signal CLK2 is a periodic signal having the same frequency as the clock signal CLK1, but differs in phase from the clock signal CLK1.

The delay circuit 475 delays the held value Q2 supplied from the previous stage, and inputs the result to the respective clear terminals C of the flip-flops 471, 472, and 473. As the delayed Q2 is input to the clear terminals C, the flip-flops 471, 472, and 473 set the held values to the initial value (low level, for example).

The XOR gate 474 outputs the exclusive OR of the held values Q2 and Q3 as an enable signal CNT_EN to the SPAD pixels 320 and the like.

Figure 21:
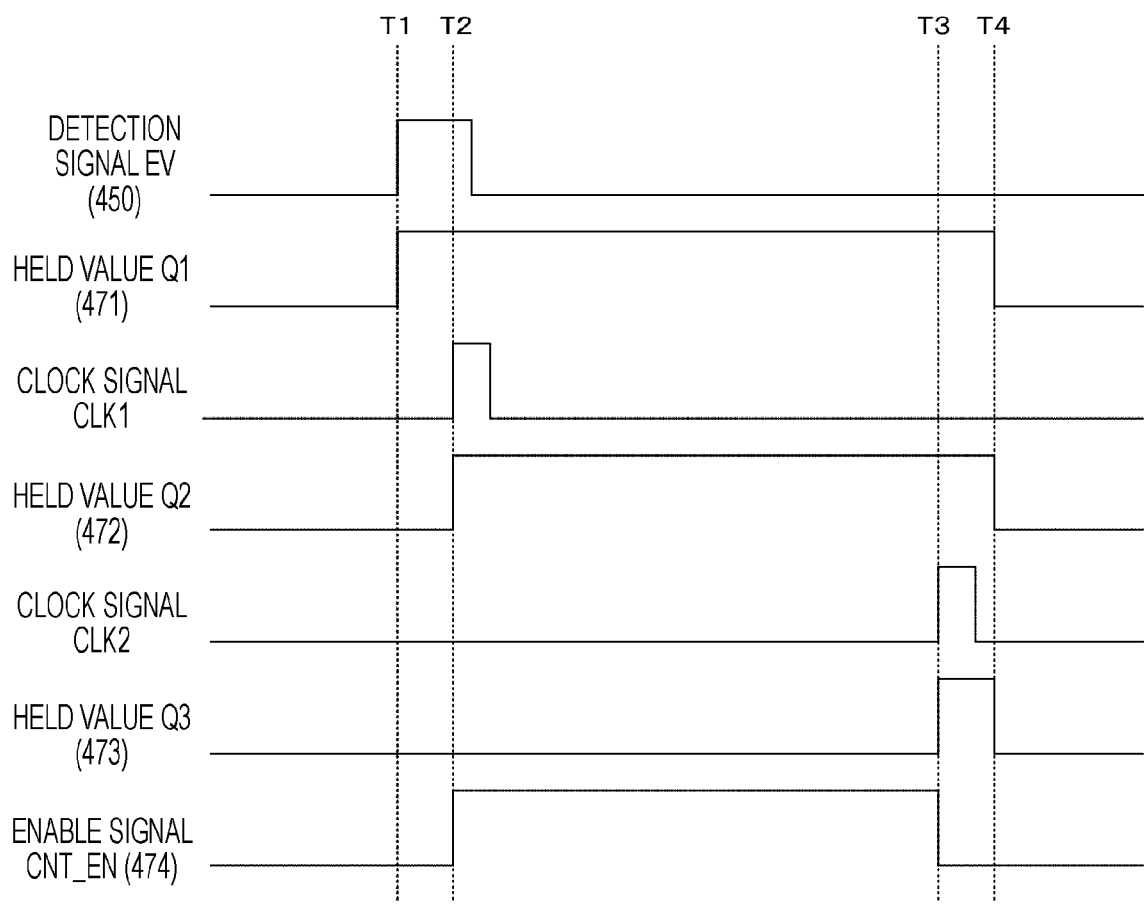
FIG. 21 is a timing chart showing an example of exposure control according to the third embodiment of the present technology.

FIG. 21 is a timing chart showing an example of exposure control according to the third embodiment of the present technology. At timing T1, a detection signal EV is input. The first-stage flip-flop 471 holds a high-level held value Q1 in synchronization with the detection signal EV.

When the clock signal CLK1 is input at timing T2, the second-stage flip-flop 472 then holds a high-level signal supplied from the previous stage as the held value Q2, in synchronization with the clock signal CLK1. As a result, the XOR gate 474 starts outputting a high-level enable signal CNT_EN.

When the clock signal CLK2 is next input at timing T3, the third-stage flip-flop 473 then holds a high-level signal supplied from the previous stage as the held value Q3, in synchronization with the clock signal CLK2. As a result, the XOR gate 474 switches the enable signal CNT_EN to low level.

At timing T4 when the delay time has elapsed since timing T3, the held values Q1 to Q3 are then initialized with the delayed signal.

As described above, the exposure control circuit 460 starts exposure in synchronization with the clock signal CLK1, and ends the exposure in synchronization with the clock signal CLK2. In the first embodiment using the shutter counter 462, it is necessary to increase the bit depth as the exposure period becomes longer, which might increase the circuit size of the shutter counter 462. In the third embodiment using the clock signals CLK1 and CLK2, on the other hand, the shutter counter 462 is not used, and accordingly, an increase in the circuit size can be prevented.

Note that each of the first and second modifications of the first embodiment can be applied to the solid-state imaging device 200 of the third embodiment. Further, the exposure control circuit 460 is not limited to the example circuit shown in FIG. 19, as long as the control illustrated in FIG. 20 can be performed.

As described above, in the third embodiment of the present technology, the exposure control circuit 460 starts exposure in synchronization with the clock signal CLK1, and ends the exposure in synchronization with the clock signal CLK2. Accordingly, the shutter counter 462 becomes unnecessary in the exposure control. Thus, the need to increase the bit depth of the shutter counter 462 as the exposure period becomes longer is eliminated, and an increase in the circuit size can be prevented.

4. Imaging Apparatus (Scan Method) According to a Fourth Embodiment

An imaging apparatus 20 according to the first example configuration described above is an asynchronous imaging apparatus that reads events by an asynchronous reading method. However, the event reading method is not necessarily an asynchronous reading method, but may be a synchronous reading method. An imaging apparatus to which a synchronous reading method is applied is a scanning imaging apparatus that is the same as a conventional imaging apparatus that performs imaging at a predetermined frame rate.

Figure 22:
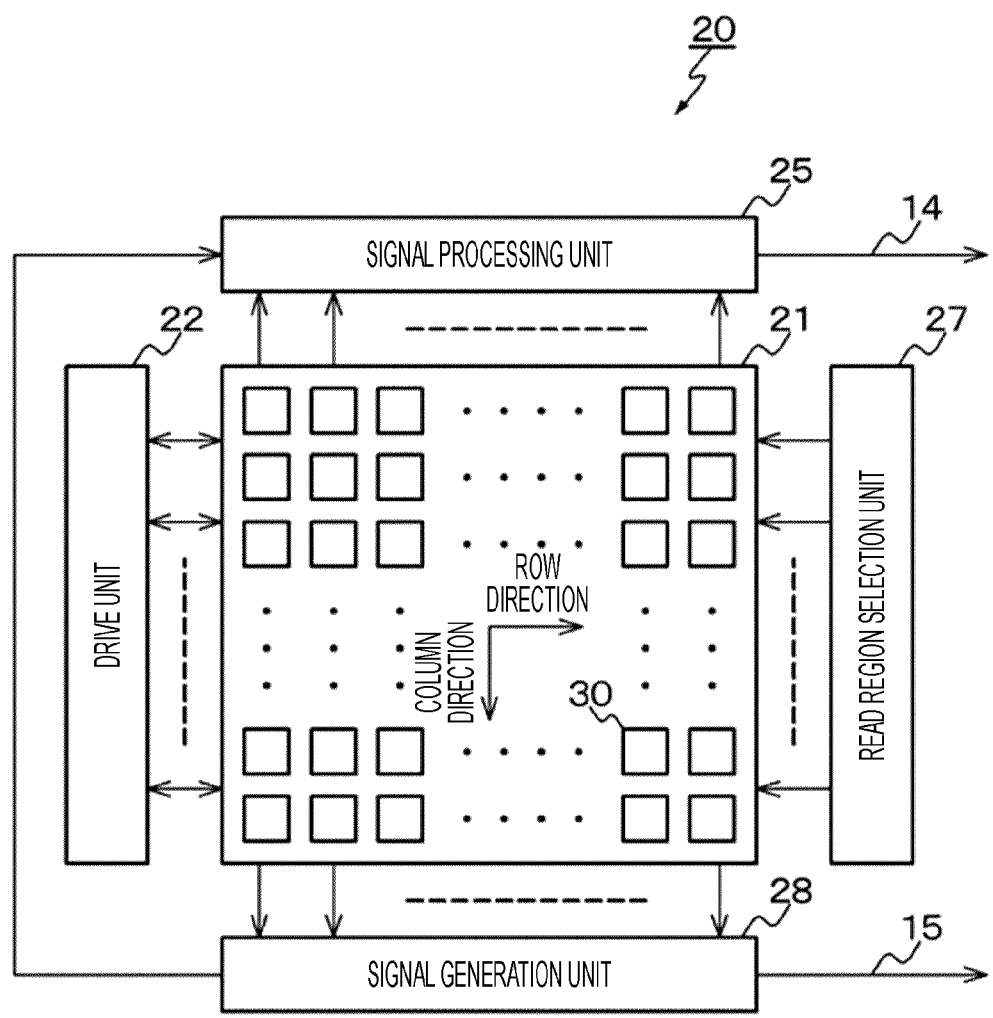
FIG. 22 is a block diagram showing an example configuration of an imaging apparatus according to a fourth embodiment of the present technology.

FIG. 22 is a block diagram showing an example configuration of an imaging apparatus according to a fourth embodiment that is used as the imaging apparatus 20 in an imaging system 10 to which the technology according to the present disclosure is applied. That is, the imaging apparatus according to the fourth embodiment is a scanning imaging apparatus.

As shown in FIG. 22, the imaging apparatus 20 according to a second example configuration as an imaging apparatus of the present disclosure includes a pixel array unit 21, a drive unit 22, a signal processing unit 25, a read region selection unit 27, and a signal generation unit 28.

The pixel array unit 21 includes a plurality of pixels 30. The plurality of pixels 30 outputs an output signal in response to a selection signal of the read region selection unit 27. The configuration of each of the plurality of pixels 30 is similar to that of the pixels (address event detection pixels and SPAD pixels) shown in FIG. 4. The plurality of pixels 30 outputs an output signal corresponding to the amount of change in light intensity. As shown in FIG. 22, the plurality of pixels 30 may be two-dimensionally arranged in a matrix.

The drive unit 22 drives each of the plurality of pixels 30 to output a pixel signal generated by each corresponding pixel 30 to the signal processing unit 25. Note that the drive unit 22 and the signal processing unit 25 are a circuit unit for acquiring tone information. Therefore, in a case where only event information is to be acquired, the drive unit 22 and the signal processing unit 25 may not be provided.

The read region selection unit 27 selects some of the plurality of pixels 30 included in the pixel array unit 21. Specifically, the read region selection unit 27 determines the selected region in response to a request from each pixel 30 of the pixel array unit 21. For example, the read region selection unit 27 selects any one or more rows included in the structure of the two-dimensional matrix corresponding to the pixel array unit 21. The read region selection unit 27 sequentially selects one or more rows in accordance with a preset cycle. The read region selection unit 27 may also determine the selected region in response to a request from each pixel 30 of the pixel array unit 21.

On the basis of output signals of the pixels selected by the read region selection unit 27, the signal generation unit 28 generates an event signal corresponding to an active pixel that has detected an event among the selected pixels. The event is an event in which the intensity of light changes. An active pixel is a pixel in which the amount of change in light intensity corresponding to an output signal exceeds or falls below a preset threshold. For example, the signal generation unit 28 compares the output signals of the pixels with a reference signal, detects an active pixel that outputs an output signal in a case where the output signal is larger or smaller than the reference signal, and generates an event signal corresponding to the active pixel.

The signal generation unit 28 may include a column selection circuit that arbitrates signals entering the signal generation unit 28, for example. The signal generation unit 28 may also be designed to output not only information about an active pixel that has detected an event, but also information about inactive pixels that do not detect any event.

Address information and time stamp information ((X, Y, T), for example) about an active pixel that has detected an event is output from the signal generation unit 28 through an output line 15. However, data that is output from the signal generation unit 28 may be not only the address information and the time stamp information, but also frame format information ((0, 0, 1, 0, . . . ), for example).

5. Example Applications to Mobile Structures

The technology (the present technology) according to the present disclosure can be applied to various products. For example, the technology according to the present disclosure may be embodied as a device mounted on any type of mobile structure, such as an automobile, an electrical vehicle, a hybrid electrical vehicle, a motorcycle, a bicycle, a personal mobility device, an airplane, a drone, a vessel, or a robot.

Figure 23:
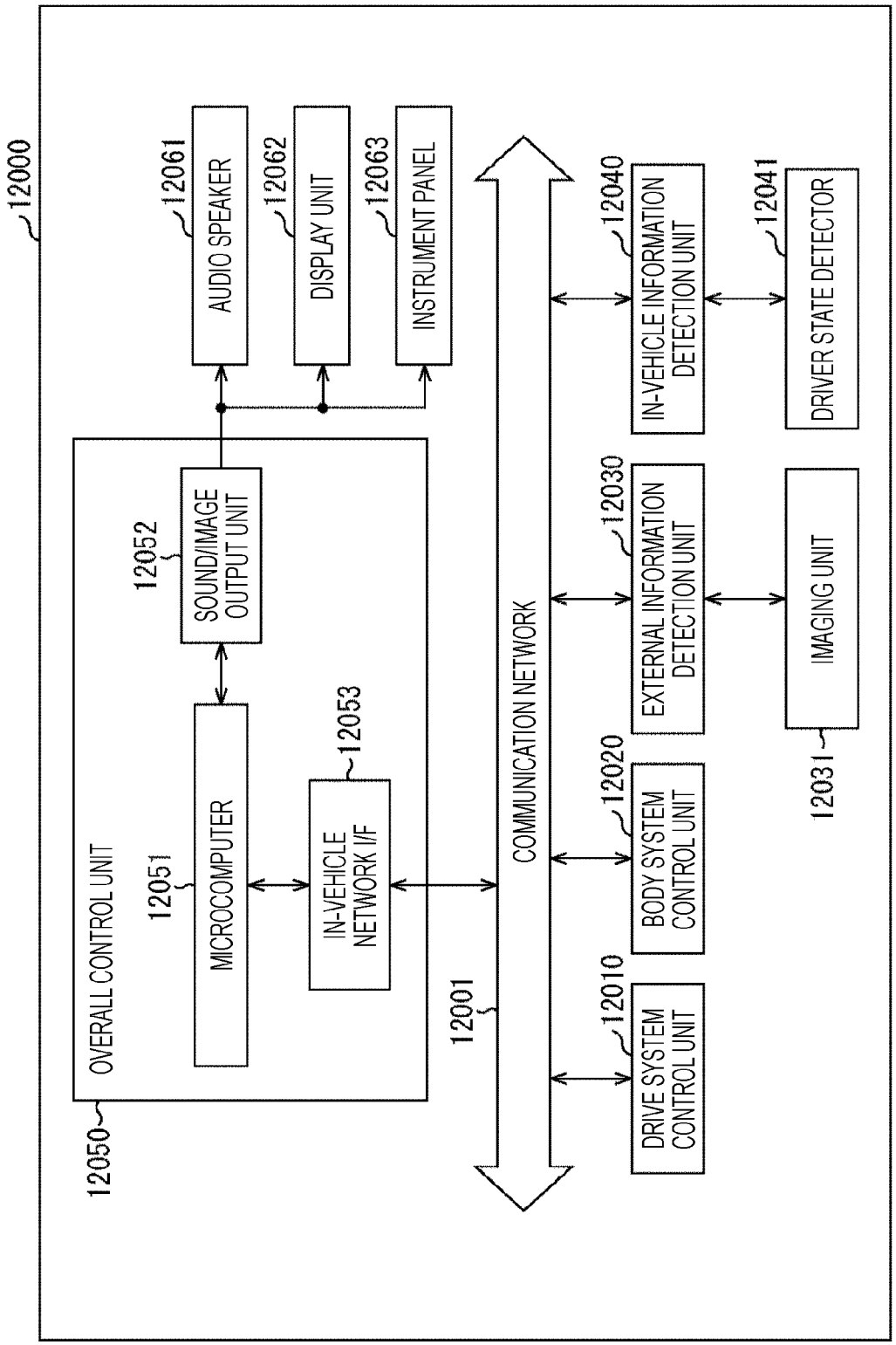
FIG. 23 is a block diagram schematically showing an example configuration of a vehicle control system.

FIG. 23 is a block diagram schematically showing an example configuration of a vehicle control system that is an example of a mobile structure control system to which the technology according to the present disclosure may be applied.

A vehicle control system 12000 includes a plurality of electronic control units connected via a communication network 12001. In the example shown in FIG. 23, the vehicle control system 12000 includes a drive system control unit 12010, a body system control unit 12020, an external information detection unit 12030, an in-vehicle information detection unit 12040, and an overall control unit 12050. Further, a microcomputer 12051, a sound/image output unit 12052, and an in-vehicle network interface (I/F) 12053 are shown as the functional components of the overall control unit 12050.

The drive system control unit 12010 controls operations of the devices related to the drive system of the vehicle according to various programs. For example, the drive system control unit 12010 functions as control devices such as a driving force generation device for generating a driving force of the vehicle such as an internal combustion engine or a driving motor, a driving force transmission mechanism for transmitting the driving force to the wheels, a steering mechanism for adjusting the steering angle of the vehicle, and a braking device for generating a braking force of the vehicle.

The body system control unit 12020 controls operations of the various devices mounted on the vehicle body according to various programs. For example, the body system control unit 12020 functions as a keyless entry system, a smart key system, a power window device, or a control device for various lamps such as a headlamp, a backup lamp, a brake lamp, a turn signal lamp, a fog lamp, or the like. In this case, the body system control unit 12020 can receive radio waves transmitted from a portable device that substitutes for a key, or signals from various switches. The body system control unit 12020 receives inputs of these radio waves or signals, and controls the door lock device, the power window device, the lamps, and the like of the vehicle.

The external information detection unit 12030 detects information outside the vehicle equipped with the vehicle control system 12000. For example, an imaging unit 12031 is connected to the external information detection unit 12030. The external information detection unit 12030 causes the imaging unit 12031 to capture an image of the outside of the vehicle, and receives the captured image. On the basis of the received image, the external information detection unit 12030 may perform an object detection process for detecting a person, a vehicle, an obstacle, a sign, characters on the road surface, or the like, or perform a distance detection process.

The imaging unit 12031 is an optical sensor that receives light, and outputs an electrical signal corresponding to the amount of received light. The imaging unit 12031 can output an electrical signal as an image, or output an electrical signal as distance measurement information. Further, the light to be received by the imaging unit 12031 may be visible light, or may be invisible light such as infrared rays.

The in-vehicle information detection unit 12040 detects information about the inside of the vehicle. For example, a driver state detector 12041 that detects the state of the driver is connected to the in-vehicle information detection unit 12040. The driver state detector 12041 includes a camera that captures an image of the driver, for example, and, on the basis of detected information input from the driver state detector 12041, the in-vehicle information detection unit 12040 may calculate the degree of fatigue or the degree of concentration of the driver, or determine whether or not the driver is dozing off.

On the basis of the external/internal information acquired by the external information detection unit 12030 or the in-vehicle information detection unit 12040, the microcomputer 12051 can calculate the control target value of the driving force generation device, the steering mechanism, or the braking device, and output a control command to the drive system control unit 12010. For example, the microcomputer 12051 can perform cooperative control to achieve the functions of an advanced driver assistance system (ADAS), including vehicle collision avoidance or impact mitigation, follow-up running based on the distance between vehicles, vehicle velocity maintenance running, vehicle collision warning, vehicle lane deviation warning, or the like.

Further, the microcomputer 12051 can also perform cooperative control to conduct automatic driving or the like for autonomously running not depending on the operation of the driver, by controlling the driving force generation device, the steering mechanism, the braking device, or the like on the basis of information about the surroundings of the vehicle, the information having being acquired by the external information detection unit 12030 or the in-vehicle information detection unit 12040.

The microcomputer 12051 can also output a control command to the body system control unit 12020, on the basis of the external information acquired by the external information detection unit 12030. For example, the microcomputer 12051 controls the headlamp in accordance with the position of the leading vehicle or the oncoming vehicle detected by the external information detection unit 12030, and performs cooperative control to achieve an anti-glare effect by switching from a high beam to a low beam, or the like.

The sound/image output unit 12052 transmits an audio output signal and/or an image output signal to an output device that is capable of visually or audibly notifying the passenger(s) of the vehicle or the outside of the vehicle of information. In the example shown in FIG. 23, an audio speaker 12061, a display unit 12062, and an instrument panel 12063 are shown as output devices. The display unit 12062 may include an on-board display and/or a head-up display, for example.

Figure 24:
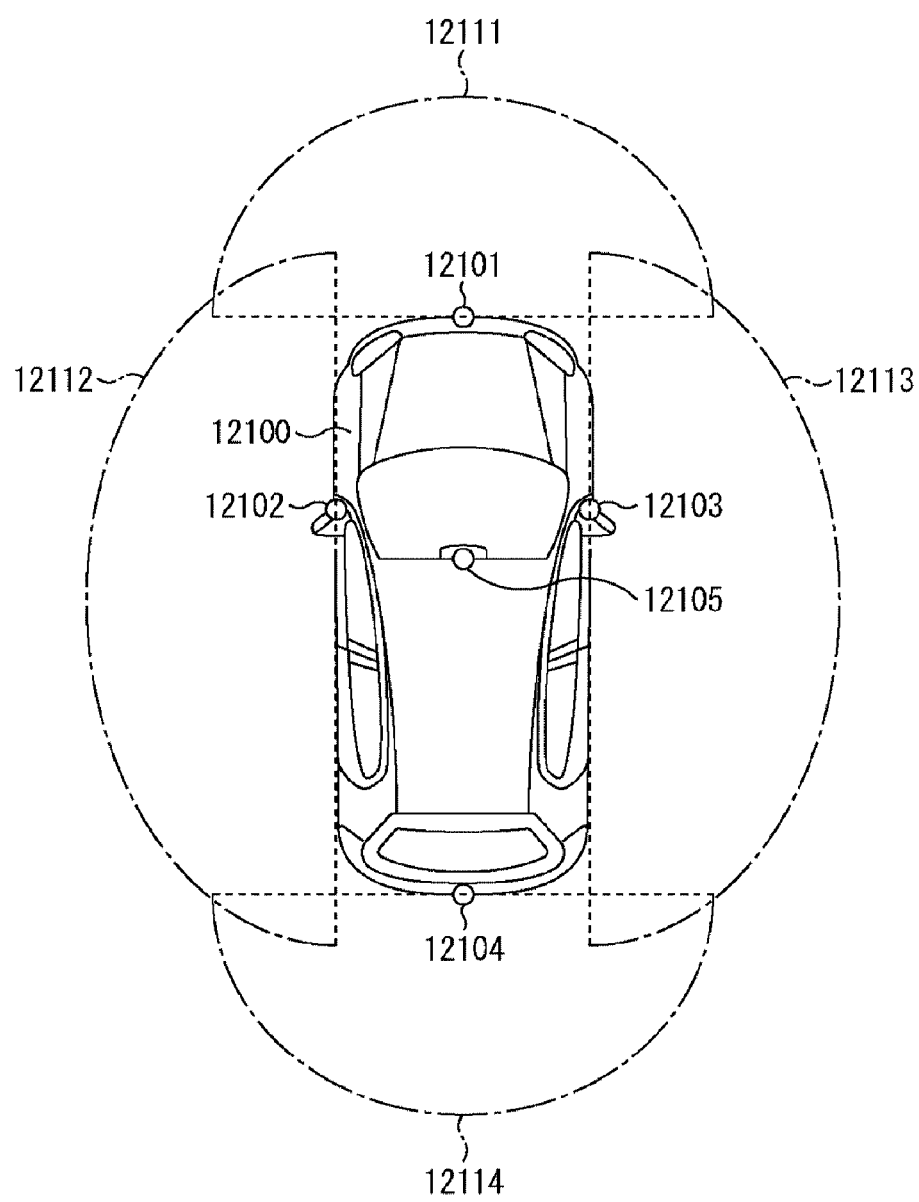
FIG. 24 is an explanatory diagram showing an example of installation positions of an external information detector and imaging units.

FIG. 24 is a diagram showing an example of installation positions of imaging units 12031.

In FIG. 24, imaging units 12101, 12102, 12103, 12104, and 12105 are included as the imaging units 12031.

Imaging units 12101, 12102, 12103, 12104, and 12105 are provided at the following positions: the front end edge of a vehicle 12100, a side mirror, the rear bumper, a rear door, an upper portion of the front windshield inside the vehicle, and the like, for example. The imaging unit 12101 provided on the front end edge and the imaging unit 12105 provided on the upper portion of the front windshield inside the vehicle mainly capture images ahead of the vehicle 12100. The imaging units 12102 and 12103 provided on the side mirrors mainly capture images on the sides of the vehicle 12100. The imaging unit 12104 provided on the rear bumper or a rear door mainly captures images behind the vehicle 12100. The imaging unit 12105 provided on the upper portion of the front windshield inside the vehicle is mainly used for detection of a vehicle running in front of the vehicle, a pedestrian, an obstacle, a traffic signal, a traffic sign, a lane, or the like.

Note that FIG. 24 shows an example of the imaging ranges of the imaging units 12101 to 12104. An imaging range 12111 indicates the imaging range of the imaging unit 12101 provided on the front end edge, imaging ranges 12112 and 12113 indicate the imaging ranges of the imaging units 12102 and 12103 provided on the respective side mirrors, and an imaging range 12114 indicates the imaging range of the imaging unit 12104 provided on the rear bumper or a rear door. For example, images captured from image data by the imaging units 12101 to 12104 are superimposed on one another, so that an overhead image of the vehicle 12100 viewed from above is obtained.

At least one of the imaging units 12101 to 12104 may have a function of acquiring distance information. For example, at least one of the imaging units 12101 to 12104 may be a stereo camera including a plurality of imaging elements, or may be imaging elements having pixels for phase difference detection.

For example, on the basis of distance information obtained from the imaging units 12101 to 12104, the microcomputer 12051 calculates the distances to the respective three-dimensional objects within the imaging ranges 12111 to 12114, and temporal changes in the distances (the velocities relative to the vehicle 12100). In this manner, the three-dimensional object that is the closest three-dimensional object on the traveling path of the vehicle 12100 and is traveling at a predetermined velocity (0 km/h or higher, for example) in substantially the same direction as the vehicle 12100 can be extracted as the vehicle running in front of the vehicle 12100. Further, the microcomputer 12051 can set beforehand an inter-vehicle distance to be maintained in front of the vehicle running in front of the vehicle 12100, and can perform automatic brake control (including follow-up stop control), automatic acceleration control (including follow-up start control), and the like. In this manner, it is possible to perform cooperative control to conduct automatic driving or the like to autonomously travel not depending on the operation of the driver.

For example, in accordance with the distance information obtained from the imaging units 12101 to 12104, the microcomputer 12051 can extract three-dimensional object data concerning three-dimensional objects under the categories of two-wheeled vehicles, regular vehicles, large vehicles, pedestrians, utility poles, and the like, and use the three-dimensional object data in automatically avoiding obstacles. For example, the microcomputer 12051 classifies the obstacles in the vicinity of the vehicle 12100 into obstacles visible to the driver of the vehicle 12100 and obstacles difficult to visually recognize. The microcomputer 12051 then determines collision risks indicating the risks of collision with the respective obstacles. If a collision risk is equal to or higher than a set value, and there is a possibility of collision, the microcomputer 12051 can output a warning to the driver via the audio speaker 12061 and the display unit 12062, or can perform driving support for avoiding collision by performing forced deceleration or avoiding steering via the drive system control unit 12010.

At least one of the imaging units 12101 to 12104 may be an infrared camera that detects infrared rays. For example, the microcomputer 12051 can recognize a pedestrian by determining whether or not a pedestrian exists in images captured by the imaging units 12101 to 12104. Such pedestrian recognition is carried out through a process of extracting feature points from the images captured by the imaging units 12101 to 12104 serving as infrared cameras, and a process of performing a pattern matching on the series of feature points indicating the outlines of objects and determining whether or not there is a pedestrian, for example. If the microcomputer 12051 determines that a pedestrian exists in the images captured by the imaging units 12101 to 12104, and recognizes a pedestrian, the sound/image output unit 12052 controls the display unit 12062 to display a rectangular contour line for emphasizing the recognized pedestrian in a superimposed manner. Further, the sound/image output unit 12052 may also control the display unit 12062 to display an icon or the like indicating the pedestrian at a desired position.

An example of a vehicle control system to which the technology according to the present disclosure may be applied has been described above. The technology according to the present disclosure can be applied to the imaging units 12031 among the components described above, for example. Specifically, the imaging apparatus 100 shown in FIG. 1 can be applied to the imaging units 12031. As the technology according to the present disclosure is applied to the imaging units 12031, captured images that are easier to view can be obtained, while address events are detected.

Note that the above described embodiments are examples for embodying the present technology, and the matter of the embodiments corresponds to the subject matter of the claims. Likewise, the subject matter of the claims corresponds to the matter under the same names as the subject matter of the claims in the embodiments of the present technology. However, the present technology is not limited to the embodiments, and various changes can be made to the embodiments without departing from the scope of the technology.

Also, the processing procedures described above in the embodiments may be regarded as a method involving the series of these procedures, or may be regarded as a program for causing a computer to carry out the series of these procedures or as a recording medium storing the program. This recording medium may be a compact disc (CD), a minidisc (MD), a digital versatile disc (DVD), a memory card, a Blu-ray (registered trademark) disc, or the like, for example.

Note that the advantageous effects described in this specification are merely examples, and the advantageous effects of the present technology are not limited to them and may further include other effects.

Note that the present technology may also be embodied in the configurations described below.

(1) A solid-state imaging device including:
a detection pixel that detects whether or not a predetermined address event has occurred, depending on whether or not the amount of change in the amount of incident light exceeds a predetermined threshold; and
a counting pixel that counts the number of photons entering during a predetermined exposure period and outputs a pixel signal indicating the count value, when the address event has occurred.

(2) The solid-state imaging device according to (1), in which
the detection pixel includes:
an address event detection circuit that detects whether or not the address event has occurred; and
an exposure control circuit that outputs a control signal indicating the exposure period to the counting pixel, when the address event has occurred.

(3) The solid-state imaging device according to (2), in which
the exposure control circuit includes:
a control signal output unit that starts outputting the control signal, when the address event has occurred;
a timer unit that measures the time elapsed since the start of the outputting of the control signal, and outputs a timer value indicating the measured time; and
an exposure end timing control unit that stops the outputting of the control signal, when the timer value matches the length of the exposure period.

(4) The solid-state imaging device according to (2), further including
a drive circuit that causes the pixel signal to be output over a predetermined reading period, when the exposure period has elapsed,
in which the exposure control circuit stops the outputting of the control signal during the reading period.

(5) The solid-state imaging device according to (2), in which,
when the address event has occurred, the exposure control circuit starts outputting the control signal in synchronization with one of two periodic signals having different phases, and stops outputting the control signal in synchronization with the other one of the two periodic signals.

(6) The solid-state imaging device according to any one of (1) to (5), in which
the counting pixel includes:
an avalanche photodiode;
a pulse conversion unit that generates a pulse signal every time a photocurrent flows into the avalanche photodiode; and
a photon counter that measures the count value in synchronization with the pulse signal.

(7) The solid-state imaging device according to (6), in which
the pulse conversion unit includes:
a resistance element connected in series to the avalanche photodiode; and
a switch that opens and closes a predetermined path in accordance with a predetermined control signal indicating the exposure period.

(8) The solid-state imaging device according to (7), in which the switch opens and closes a path between the avalanche photodiode and the resistance element.

(9) The solid-state imaging device according to claim 7, in which the switch opens and closes a path between a connection point between the avalanche photodiode and the resistance element, and the photon counter.

(10) The solid-state imaging device according to any one of (1) to (9), in which
the detection pixel is disposed in each pixel block in a plurality of pixel blocks,
a predetermined number of the counting pixels are arrayed in each pixel block of the plurality of pixel blocks, and
the counting pixel counts the number of photons in a pixel block in which the address event has occurred among the plurality of pixel blocks.

(11) The solid-state imaging device according to any one of (1) to (9), in which
the counting pixels are arrayed in a two-dimensional lattice pattern, and
the detection pixels are aligned in a predetermined direction.
(12) The solid-state imaging device according to any one of (1) to (9), in which
the detection pixel is larger in size than the counting pixel.
(13) An imaging apparatus including:
a detection pixel that detects whether or not a predetermined address event has occurred, depending on whether or not the amount of change in the amount of incident light exceeds a predetermined threshold;
a counting pixel that counts the number of photons entering during a predetermined exposure period and outputs a pixel signal indicating the count value, when the address event has occurred; and
a signal processing unit that processes the pixel signal.
(14) A method for controlling a solid-state imaging device,
the method including:
a detecting step in which a detection pixel detects whether or not a predetermined address event has occurred, depending on whether or not the amount of change in the amount of incident light exceeds a predetermined threshold; and
a counting step in which a counting pixel counts the number of photons entering during a predetermined exposure period and outputs a pixel signal indicating the count value, when the address event has occurred.

REFERENCE SIGNS LIST

100 Imaging apparatus
110 Imaging lens
120 Recording unit
130 Control unit
200 Solid-state imaging device
201 Light receiving chip
202 Circuit chip
211 Drive circuit
212 Signal processing unit
213 Arbiter
214 Pixel array unit
310 Address event detection pixel
320 SPAD pixel
321, 324, 414, 421, 422, 432, 433, 441, 443 P-type transistor
322, 327 Switch
323 Avalanche photodiode
325, 412, 415, 435, 442, 444 N-type transistor
326 Photon counter
328 Pulse conversion unit with enablement
329 Reset signal generation unit
400 Address event detection circuit
410 Logarithmic response unit
411 Photoelectric conversion element
413, 431, 434 Capacitance
416 Current-voltage conversion unit
420 Buffer
430 Differentiating circuit
440 Comparator
450 Transfer circuit
460 Exposure control circuit
461 Enable signal output unit
462 Shutter counter
463 Exposure end timing control unit
471, 472, 473 Flip-flop
474 XOR (exclusive OR) gate
475 Delay circuit
12031 Imaging unit

The invention claimed is:
1. A solid-state imaging device, comprising:
a detection pixel configured to detect occurrence of a specific address event, based on whether or not an amount of change in an amount of incident light exceeds a specific threshold; and
a counting pixel configured to count a number of photons that enters during a specific exposure period and output a pixel signal indicating a count value, when the specific address event has occurred, wherein the detection pixel is larger than the counting pixel.
2. The solid-state imaging device according to claim 1, wherein the detection pixel includes:
an address event detection circuit configured to detect the occurrence of the specific address event; and
an exposure control circuit configured to output, when the specific address event has occurred, a control signal that indicates the specific exposure period to the counting pixel.
3. The solid-state imaging device according to claim 2, wherein the exposure control circuit includes:
a control signal output unit configured to start output of the control signal, when the specific address event has occurred;
a timer unit configured to:
measure time elapsed since a start of the output of the control signal, and
output a timer value that indicates the measured time; and
an exposure end timing control unit configured to stop the output of the control signal, based on the timer value that matches a length of the specific exposure period.
4. The solid-state imaging device according to claim 2, further comprising a drive circuit configured to cause, based on elapse of the specific exposure period, the pixel signal to be output over a specific reading period,
wherein the exposure control circuit is further configured to stop the output of the control signal during the specific reading period.
5. The solid-state imaging device according to claim 2, wherein, when the specific address event has occurred, the exposure control circuit is further configured to:
start the output of the control signal in synchronization with one of two periodic signals having different phases; and
stop the output of the control signal in synchronization with other one of the two periodic signals.
6. The solid-state imaging device according to claim 1, wherein the counting pixel includes:
an avalanche photodiode;
a pulse conversion unit configured to generate a pulse signal every time a photocurrent flows into the avalanche photodiode; and
a photon counter configured to measure the count value in synchronization with the pulse signal.
7. The solid-state imaging device according to claim 6, wherein the pulse conversion unit includes:
a resistance element connected in series to the avalanche photodiode; and
a switch configured to open and close a specific path based on a specific control indicating that indicates the specific exposure period.

8. The solid-state imaging device according to claim 7, wherein the switch is further configured to open and close a path between the avalanche photodiode and the resistance element.

9. The solid-state imaging device according to claim 7, wherein the switch is further configured to open and close a path between the photon counter and a connection point between the avalanche photodiode and the resistance element.

10. The solid-state imaging device according to claim 1, wherein
the detection pixel is disposed in each pixel block of a plurality of pixel blocks,
a specific number of counting pixels are arrayed in each pixel block of the plurality of pixel blocks, and
the counting pixel is further configured to count the number of photons in a pixel block in which the specific address event has occurred among the plurality of pixel blocks.

11. The solid-state imaging device according to claim 1, wherein
counting pixels are arrayed in a two-dimensional lattice pattern, and
detection pixels are aligned in a specific direction.

12. An imaging apparatus, comprising:
a detection pixel configured to detect occurrence of a specific address event, based on whether or not an amount of change in an amount of incident light exceeds a specific threshold;
a counting pixel configured to count a number of photons that enters during a specific exposure period and output a pixel signal indicating a count value, when the specific address event has occurred, wherein the detection pixel is larger than the counting pixel; and
a signal processing unit configured to process the pixel signal.

13. A method for controlling a solid-state imaging device, the method comprising:
detecting, by a detection pixel, occurrence of a specific address event, based an amount of change in an amount of incident light exceeds a specific threshold;
counting, by a counting pixel, a number of photons entering during a specific exposure period; and
outputting a pixel signal that indicates a count value, when the specific address event has occurred, wherein the detection pixel is larger than the counting pixel.

* * * * *